United States Patent [19]
Mizutani et al.

[11] Patent Number: 4,807,204
[45] Date of Patent: Feb. 21, 1989

[54] MAGNETO-OPTICAL RECORDING MEDIUM HAVING PAIRS OF MUTUALLY CORRESPONDING RECORDING SEGMENTS, AND APPARATUS FOR RECORDING INFORMATION ON THE MEDIUM

[75] Inventors: Shuzo Mizutani; Riki Matsuda; Kazunari Taki, all of Nagoya; Yutaka Hattori, Aichi; Kazuyuki Miyaki, Ichinomiya; Shinichi Hirahata, Nagoya, all of Japan

[73] Assignee: Brother Kogyo Kabushiki Kaisha, Aichi, Japan

[21] Appl. No.: 70,346

[22] Filed: Jul. 6, 1987

[30] Foreign Application Priority Data

| Jul. 7, 1986 | [JP] | Japan | 61-159345 |
| Jul. 10, 1986 | [JP] | Japan | 61-162640 |
| Jul. 12, 1986 | [JP] | Japan | 61-107315[U] |
| Jul. 17, 1986 | [JP] | Japan | 61-109960[U] |
| Jul. 17, 1986 | [JP] | Japan | 61-109961[U] |
| Jul. 17, 1986 | [JP] | Japan | 61-109962[U] |

[51] Int. Cl.$^4$ .................... G11B 11/14; G11B 13/04
[52] U.S. Cl. .................... 369/13; 360/114; 360/59; 365/122
[58] Field of Search ............... 369/13; 360/59, 114; 365/122

[56] References Cited

U.S. PATENT DOCUMENTS

| 4,544,443 | 10/1985 | Ohta et al. | 369/13 |
| 4,612,587 | 9/1986 | Kaneko et al. | 360/114 |
| 4,737,947 | 4/1988 | Osato et al. | 369/13 |

FOREIGN PATENT DOCUMENTS

| 0225141 | 6/1987 | European Pat. Off. | 360/114 |
| 0227480 | 7/1987 | European Pat. Off. | 360/114 |
| 0252445 | 1/1988 | European Pat. Off. | 360/114 |
| 61-172235 | 8/1986 | Japan | 360/114 |
| 61-227244 | 10/1986 | Japan | 360/114 |
| 61-278058 | 12/1986 | Japan | 360/114 |

Primary Examiner—Raymond F. Cardillo
Assistant Examiner—Hoa T. Nguyen
Attorney, Agent, or Firm—Parkhurst, Oliff & Berridge

[57] ABSTRACT

A magneto-optical recording apparatus for writing information on a magneto-optical recording medium having at least one pair of magneto-optical storage layers each pair consisting of a first and a second storage layer which have at least one pair of corresponding recording segments, each pair of mutually corresponding recording segments consisting of a first recording segment provided on the first storage layer and a second recording segment provided on the second storage layer. The apparatus includes a first and a second writing/erasing head for writing and erasing information on the first and second storage layers, and a recording controller for activating one of the first and second writing/erasing heads to erase previous information already recorded on corresponding one of the first and second recording segments, while activating the other head to write first new information on the other of the first and second recording segments. Upon reception of a command to write second new information, the recording control means activating the above-indicated other head to erase the first new information recorded on the above-indicated other recording segment, while activating the above-indicated one head to write the second new information on the above-indicated one recording segment.

13 Claims, 17 Drawing Sheets

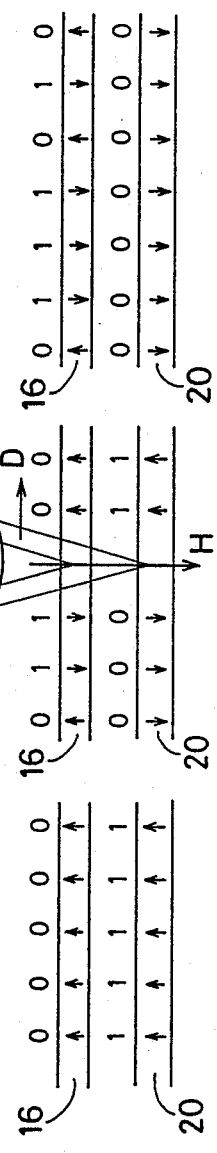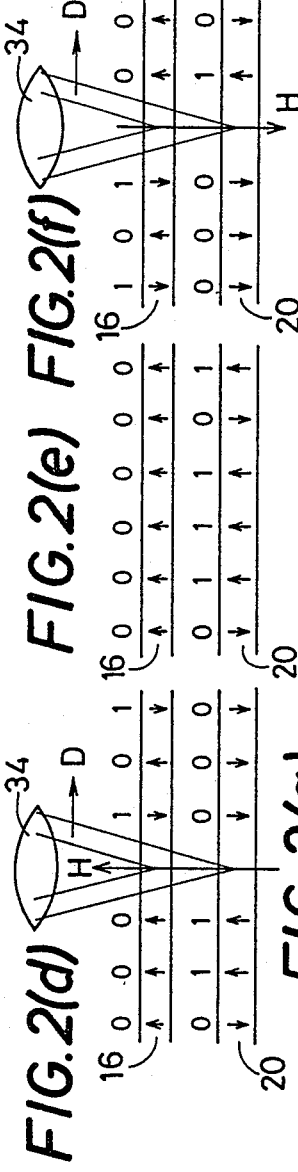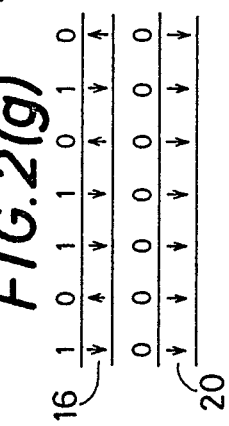

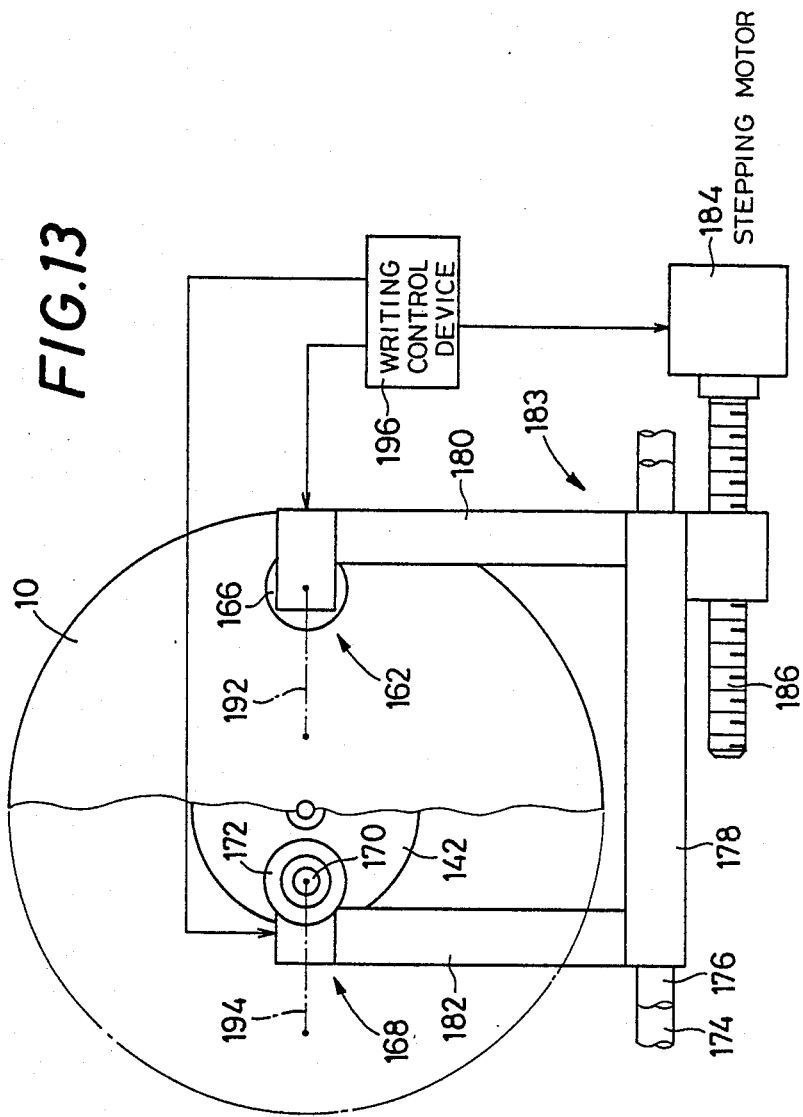

MAGNETO-OPTICAL RECORDING MEDIUM HAVING PAIRS OF MUTUALLY CORRESPONDING RECORDING SEGMENTS, AND APPARATUS FOR RECORDING INFORMATION ON THE MEDIUM

BACKGROUND OF THE INVENTION

1. Field of the Invention

The present invention relates improvements in a magneto-optical recording medium, and an apparatus for recording information on such a recording medium.

2. Discussion of the Prior Art

There is known a magneto-optical recording medium which has a magneto-optical storage layer whose local spots are magnetized in one of opposite directions, depending upon information signals to be written. Prior to writing information on the storage layer, it is necessary to erase the previously recorded information, by clearing the magnetization of the storage layer. This erasing step requires an extra time, which is unnecessary in a recording operation on a magnetic disc, wherein information may be overwritten on a previously recorded track.

It is also known to overwrite information on a magneto-optical storage layer, by exposing local spots on the storage layer to a laser beam and subjecting the exposed local spots to a magnetic field which is modulated according to desired information to be written. However, this method suffers from a relatively low recording efficiency, since the maximum frequency at which the direction of the magnetic field can be reversed is comparatively limited.

SUMMARY OF THE INVENTION

It is accordingly an object of the present invention to provide a magneto-optical recording apparatus which is capable of writing information on a recording medium at a comparatively high speed.

According to the present invention, there is provided a magneto-optical recording apparatus for writing information on a magneto-optical recording medium, wherein the improvement comprises: (a) the magneto-optical recording medium having at least one pair of magneto-optical storage layers each pair consisting of a first storage layer and a second storage layer, the first and second storage layers having at least one pair of corresponding recording segments, each of the at least one pair of mutually corresponding recording segments consisting of a first recording segment provided on the first storage layer and a second recording segment provided on the second storage layer; (b) first writing/erasing means for writing and erasing information on the first storage layer; (c) second writing/erasing means for writing and erasing information on the second storage layer; and (d) recording control means connected to the first and second writing/erasing means, for activating one of the first and second writing/erasing means to erase previous information already recorded on corresponding one of the first and second recording segments, while activating the other of the first and second writing/erasing means to write first new information on the other of the first and second recording segments. Upon reception of a command to write second new information, the recording control means activates the other writing/erasing means to erase the first new information recorded on the other of the first and second recording segments, while activating the above-indicated one writing/erasing means to write the second new information on the above-indicated one of the first and second recording segments.

In the magneto-optical recording apparatus of the present invention constructed as described above, the recording control means activates, for example, the first writing/erasing means to erase the previous information recorded on the first recording segment on the first storage layer, while activating the second writing/erasing means to write new information on the second recording segment on the second storage layer. When second new information is recorded on the same pair of mutually corresponding recording segments, the first writing/erasing means is activated to write that second new information on the first recording segment which has been cleared in the last recording operation. At the same time, the second writing/erasing means is activated to clear the second recording segment on which the last information has been written in the last recording operation. Accordingly, the instant recording apparatus does not require a time for erasing the previous information prior to writing the new information, and consequently permits a high information recording speed, as in a recording operation on a magnetic disc, in which information is overwritten on a recording segment while erasing or destroying previous information already stored on that recording segment.

According to one feature of the invention, the magneto-optical recording medium comprises a magneto-optical memory disc which has the above-indicated at least one pair of magneto-optical storage layers formed on one of opposite sides thereof, and the first and second writing/erasing means comprise a single common optical head or a pair of optical heads disposed opposite to the above-indicated one of opposite sides of the memory disc, to expose local spots on the first and second storage layers to light beams.

According to another feature of the invention, the magneto-optical recording medium comprises a magneto-optical memory disc which has the first and second storage layers on opposite sides thereof, respectively, and the first and second writing/erasing means comprise a pair of optical heads which are disposed opposite to the opposite sides of the memory disc, to expose local spots on the first and second storage layers to light beams.

According to a further feature of the invention, each of the first and second recording segments of the first and second storage layers of each pair of magneto-optical storage layers has a check bit, and a series of recording bits following the check bit. The check bit indicates whether information has been recorded on the recording bits. The writing control means is adapted to establish one of a writing mode and an erasure mode for each of the first and second writing/erasing means, depending upon a state of the check bit.

According to another aspect of the present invention, there is provided a magneto-optical recording apparatus for writing information on a magneto-optical recording medium, wherein the improvement comprises: (a) the magneto-optical recording medium having at least one pair of magneto-optical storage layers each pair consisting of a first storage layer formed on one of opposite sides thereof, and a second storage layer formed on the other side thereof; (b) a first optical head disposed opposite to the one side of the recording medium for writing information on the first storage layer, the first optical head including a first magnetizing coil and having a first focal point on the first storage layer; (c) a second optical head disposed opposite to the other side of the recording medium for writing information on the second storage layer, the second optical head having a second magnetizing coil and including a second focal point on the second storage layer; (d) first positioning means for positioning the first optical head such that the first focal point is moved along a first path parallel to the first storage layer; and (e) second positioning means for positioning the second optical head such that the second focal point is moved along a second path parallel to the second storage layer. The first and second paths extend so as not to intersect each other in a plane parallel to a plane of the recording medium.

In the magneto-optical recording apparatus according to the above described aspect of the invention, the first and second optical heads moved by the respective first and second positioning means will not interference with each other within an effective recording area of the first and second storage layers, since the first and second paths taken by the two heads are determined so as not to intersect each other as viewed in a direction perpendicular to the plane of the recording medium. Consequently, a magnetic field produced by the first magnetizing coil will not interference with a magnetic field produced by the second magnetizing coil. This arrangement assures correct writing and erasing operations by the two optical heads without a magnetic interference between two heads, irrespective of the relative positions of the two heads with respect to the recording medium.

According to one feature of the above aspect of the invention, the magneto-optical recording medium comprises a magneto-optical memory disc which has the first and second storage layers on opposite sides thereof, respectively, and the first and second positioning means comprises: a common holder for supporting the first and second optical heads such that the first and second paths are alinged with a straight line passing an axis of rotation of the memory disc, and such that the first and second optical heads are located on opposite sides of the axis of rotation; and guiding means for guiding the common holder to move the first optical head in one of radially inward and outward directions of the memory disc while moving the second optical head in the other of the radially inward and outward directions.

According to another feature of the same aspect of the invention, the magneto-optical recording medium comprises a magneto-optical memory disc which has the first and second storage layers on opposite sides thereof, respectively, and the first and second positioning means are operable to move the first and second optical heads such that the first path and the second path lie on respective first and second straight lines which intersect each other at a point adjacent to an axis of rotation of the memory disc. In one form of this feature, the first and second optical heads comprise a common stationary head body which emits a first light beam in a first direction parallel to the first path, and a second light beam in a second direction parallel to the second path, and further comprise a first and a second movable part which are movable along the first and second paths, respectively. The first and second movable parts are adapted to receive the first and second light beams from the stationary head body, and covergr the received first and second light beams on the first and second storage layers, respectively.

In accordance with a further aspect of the invention, there is provided a magneto-optical recording apparatus for writing information on a magneto-optical recording medium, wherein the improvement comprises: (a) the magneto-optical recording medium having at least one pair of magneto-optical storage layers each pair consisting of a first storage layer formed on one of opposite sides thereof, and a second storage layer formed on the other side thereof, the first and second storage layers having at least one pair of mutually corresponding recording segments, each of the at least one pair of corresponding recording segments consisting of a first recording segment provided on the first storage layer and a second recording segment provided on the second storage layer; (b) a first optical head for exposing local spots on the first storage layer to a first light beam and thereby writing and erasing information on the first storage layer, the first optical head having a first focal point on the first storage layer; (c) second optical head for exposing local spots on the second storage layer to a second light beam and thereby writing and erasing information on the second storage layer, the second optical head having a second focal point which is adjacent to the first focal point in a direction parallel to the first and second storage layers; (d) common magnetic-field generating means for producing magnetic fields in a predetermined direction, at the exposed local spots on the first and second storage layers; and (e) recording control means for activating the magnetic-field generating means to produce the magnetic fields, and activating one of the first and second optical heads to erase previous information already recorded on corresponding one of the first and second recording segments of the each pair of corresponding recording segments, while activating the other of the first and second optical heads to write first new information on the other of the first and second recording segments. Upon reception of a command to write second new information, the recording control means activates the other optical head to erase the first new information recorded on the other of the first and second recording segments, while activating the above-indicated one optical head to write the second new information on the above-indicated one of the first and second recording segments.

In the magneto-optical recording apparatus according to the above aspect of the invention, the recording control means activates, for example, the first writing/erasing means to erase the previous information recorded on the first recording segment on the first storage layer, while activating the second writing/erasing means to write new information on the second recording segment on the second storage layer. When the recording control means receives a command to write second new information on the same pair of mutually corresponding recording segments, the first writing/erasing means is activated to write that second new information on the first recording segment which has been cleared in the last recording cycle. At the same time, the second writing/erasing means is activated to clear the second recording segment on which the last or first new information has been written in the last recording cycle. Accordingly, the instant recording apparatus does not require a time for erasing the previous information prior to writing the new information, and consequently permits a high recording speed, as in a recording operation on a magnetic disc, in which information is overwritten on a recording segment while erasing or destroying previous information already stored on that recording segment.

Further, since the first and second focal points of the first and second optical heads are positioned adjacent to each other, the magnetic field produced by the single common magnetic-field generating means may cover the corresponding exposed spots on both of the first and second storage layers, when information is written or erased at these spots. Accordingly, the recording apparatus may be significantly simplified in construction.

According to a still further aspect of the invention, there is provided a magneto-optical recording apparatus for writing information on a magneto-optical memory disc, wherein the improvement comprises: (a) the magneto-optical memory disc having at least one pair of magneto-optical storage layers each pair consisting of a first storage layer and a second storage layer which are formed on opposite sides thereof, each of the first and second storage layers having at least one recording track which is formed in a substantially circumferential direction of the memory disc; (b) a first optical head disposed on one of the opposite sides of the memory disc, for writing first information on the at least one recording track on the first storage layer; (c) a second optical head disposed on the other side of the memory disc, for writing second information on the at least one recording track on the second storage layer; (d) driving means for rotating the memory disc about an axis thereof, between the first and second optical heads, during operations of the first and second optical heads; and (e) recording control means for activating the first and second optical heads and the driving means such that the first information and the second information are written on the recording tracks on the first and second storage layers, respectively, in the same circumferential direction of the memory disc, as viewed in a direction parallel to the axis of rotation of the memory disc, from one of the first and second optical heads toward the other optical head.

In the magneto-optical recording apparatus constructed as described above, writing and erasing operations on both of the first and second storage layers are effected in the same circumferential direction of the memory disc, as viewed in one direction perpendicular to the plane of the memory disc. In other words, the first and second optical heads may be operated simultaneously to write or erase information on the first and second storage layers, by rotating the memory disc in the same direction. Therefore, it is possible to write information on both of the first and second storage layers, without reversing the rotating direction of the memory disc. In this case, the effective memory capacity of the disc can be increased without increasing the access time due to reversing the memory disc upon switching from one of the first and second storage layers to the other.

Further, the above arrangement permits efficient alternate writing and erasing operations on the first and second storage layers on the opposite sides of the memory disc, by rotating the memory disc in the same direction. Thus, the recording operation can be achieved efficiently, as in a magnetic recording operation wherein information is overwritten.

According to one feature of the above aspect of the invention, the above-indicated at least one recording track of each of the first and second storage layers consists of a multiplicity of concentric tracks which have centers at the axis of rotation of the memory disc.

According to another feature of the same aspect of the invention, the above-indicated at least one recording track of each of the first and second storage layers consists of a single spiral track which has an inner end near the axis of rotation of the memory disc. The spiral track of the first storage layer is formed in one of clockwise and counterclockwise directions as viewed from said first optical head toward said second optical head while the spiral track of the second storage layer is formed in the other of the clockwise and counterclockwise directions as viewed from said second optical head toward said first optical head.

According to a further feature of the same aspect of the invention, the above-indicated at least one pair of magneto-optical storage layers consists of a plurality of pairs of magneto-optical storage layers. Each of the first and second storage layers of each of the plurality of pairs of magneto-optical storage layers consists of a single spiral track which has an inner end near the axis of rotation of the memory disc. The spiral track of the first storage layer is formed in one of clockwise and counterclockwise directions while the spiral track of the second storage layer is formed in the other of the clockwise and counterclockwise directions.

In accordance with a yet further feature of the invention, there is provided a magneto-optical recording medium for storing information, comprising at least one first magneto-optical storage layer formed on one of opposite sides thereof, and at least one second magneto-optical storage layer formed on the other side thereof. The information is written on the above-indicated at least one first storage layer and the above-indicated at least one second storage layer, by a pair of optical heads disposed opposite to the opposite sides of the recording medium, while the medium and the pair of optical heads are moved relative to each other. The recording medium further comprises a magnetic shielding layer interposed between the at least one first storage layer and the at least one second storage layer.

In the magneto-optical recording medium constructed as described above, the magnetic shielding layer avoids an interference between two magnetic fields simultaneously produced by magnetizing coils of the two optical heads on the opposite sides of the recording medium, even when the first and second storage layers subjected to the magnetic fields are located close to each other. Thus, the magnetic shielding layer assures correct simultaneous writing and erasing operations on the opposite sides of the recording medium. Preferably, the magnetic shielding layer is made of a highly magnetically permeable material such as iron, nickel alloy, Permalloy or Sendalloy. The thickness of the shielding layer is selected so as to provide a sufficiently high magnetic shielding effect.

According to yet another feature of the invention, there is provided a magneto-optical recording medium having a laminar structure for storing information via at least one optical head, comprising a plurality of magneto-optical storage layers including an outermost layer nearest to the optical head. The plurality of magneto-optical storage layers except the outermost layer is exposed to a light beam transmitted through the outermost storage layer. At least the outermost layer of the plurality of magneto-optical storage layers is made of a transparent magnetic material.

In the magneto-optical recording medium as described above, the outermost magneto-optical storage layer made of a transparent magnetic material absorbs only a reduced amount of the light beam which is directed to the other magneto-optical storage layers. Therefore, the required output of the light source of the optical head may be reduced, or alternataively the number of the magneto-optical layers of the medium may be increased, without increasing the capacity of the light source. The term "transparent magnetic material" is interpreted to means a material which has a comparatively low absorption factor for a specific wavelength of the light beam emitted by the optical head.

The transparent magnetic material is preferably selected from the group which consists of: a magnetic garnet selected from the group consisting of $Gd_2Bi_1Fe_5O_{12}$, $Gd_3Fe_5O_{12}$ and YIG ($Y_3Fe_5O_{12}$); and an orthoferrite such as $FeBO_3$.

BRIEF DESCRIPTION OF THE DRAWINGS

The above and other objects, features and advantages of the present invention will become more apparent by reading the following detailed description of preferred embodiments of the invention, when considered in connection with the accompanying drawings, in which:

FIGS. 2(a) through 2(g) are illustrations of information writing operations of the recording apparatus of FIG. 1, in which FIG. 2(a) shows an initial state of a memory disc, FIG. 2(b) shows a writing operation on a first magneto-optical storage layer and an erasing operation on a second magneto-optical storage layer, FIG. 2(c) shows states of the memory disc after the writing and erasing operations on the first and second storage layers, respectively, FIG. 2(d) shows a writing operation on the second storage layer and an erasing operation on the first storage layer, FIG. 2(e) shows states of the memory disc after the writing and erasing operations on the second and first storage layers, respectively, FIG. 2(f) shows a writing operation on the first storage layer and an erasing operation on the second storage layer, and FIG. 2(g) shows states of the memory disc after the writing and erasing operations on the first and second storage layers.

FIGS. 7(a) through 7(d) are illustrations of information writing operations of the recording apparatus of FIG. 6, in which FIG. 7(a) shows an initialized state of a memory disc, FIG. 7(b) shows a writing operation on a first magneto-optical storage layer, FIG. 7(c) shows a writing operation on a second magneto-optical storage layer and an erasing operation on the first storage layer, and FIG. 7(d) shows a writing operation on the first storage layer and an erasing operation on the second storage layer.

FIG. 13 is a plan view of the embodiment of FIG. 12;

FIGS. 20(a) through 20(d) are views showing operations of the apparatus of FIG. 19, corresponding to the views of FIGS. 7(a) through 7(d);

DETAILED DESCRIPTION OF THE PREFERRED EMBODIMENTS

Figure 1:
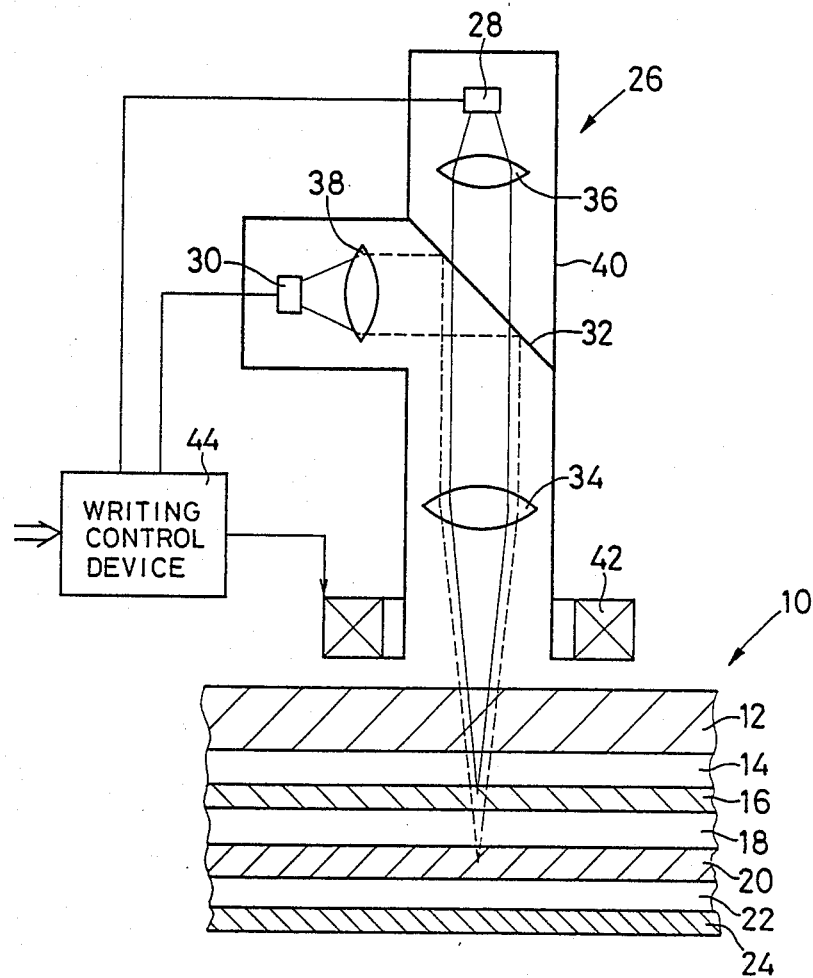
FIG. 1 is a schematic view of one embodiment of a magneto-optical recording apparatus of the present invention.

Referring first to FIG. 1, there is generally shown at 10 a magneto-optical recording medium in the form of a memory disc. This magneto-optical memory disc 10 is continuously rotated about its axis by a suitable drive (not shown). The memory disc 10 is a laminar structure which consists of a transparent substrate layer 12, a non-magnetic layer 14, a first magneto-optical storage layer 16, an intermediate non-magnetic layer 18, a second magneto-optical storage layer 20, a non-magnetic layer 22 and a reflector layer 24, the last six layers 14, 16, 18, 20, 22 and 24 being superposed one on another in the order of description, on one surface of the substrate layer 12, by vapor deposition, sputtering or other suitable methods known in the art. The transparent substrate layer 12 are preferably formed of a glass material, transparent resin material such as acrylic resin and PMMA (polymethyl methacrylate), or other suitable transpatent material. The non-magnetic layers 14, 18 and 22 are preferably made of a transparent non-magnetic material such as aluminum nitride, silicon oxide, silicon dioxide or silicon nitride. The magneto-optical storage layers 16, 20 are preferably made of a material which has a high magneto-optical effect, such as amorphous GdTbFe, TbFeCo, GdCo or GdDyFe, polycrystalline MnCuBi, monocrystalline TbFeO$_3$, or rare earth iron garnet. The reflector layer 24 is usually a film formed by vapor deposition of aluminum, but may be a plastic film having a relatively large thickness.

Above the magneto-optical memory disc 10, there is shown an optical head 26 including a housing 40 which accommodates therein: a first semiconductor laser element 28; a second semiconductor laser element 30; a half mirror 32 for aligning laser beams from the pair of laser elements 28, 30 in a common optical axis; an object lens 34 positioned opposite to the memory disc 10; a first lens 36 disposed for converging primarily the laser beam from the first laser element 28 on the first magneto-optical storage layer 16; and a second lens 38 disposed for converging primarily the laser beam from the second laser element 30 on the second magneto-optical storage layer 20.

The housing 40 is supported by a suitable support device (not shown), movably in the radial direction of the memory disc 10, and is positioned by a suitable driving device (not shown), so that the optical head 26 may be positioned to a desired point in the radial direction of the disc 10. The optical head 26 further includes an annular magnetizing coil 42 secured to the end of the housing 40 on the side of the memory disc 10. The magnetizing coil 42 is activated by a writing control device 44, to magnetize exposed spots on the first and second storage layers 16, 20, in one of opposite directions determined by a direction of flow of an electric current supplied by the control device 44 to the coil. The magnetizing directions are perpendicular to the storage layers 16, 20. Namely, the exposed spots are magnetized by the coil 42 in the direction of thickness of the memory disc 10. In the present embodiment, the coil 42 constitutes magnetic-field generating means in the present embodiment, and the optical head 26 constitutes first writing/erasing means for writing and erasing information on the first magneto-optical storage layer 16, and second writing/erasing means for writing and erasing information on the second magneto-optical storage layer 20.

The writing control device 44, which serves as recording control means, is also adapted to control outputs of the first and second semiconductor laser elements 28, 30 upon writing information on the memory disc 10. Described more specifically, the laser elements 28, 30 are controlled so as to produce laser beams continuously upon erasure of information on the disc 10, or produce modulated laser beams corresponding to signals to be written upon recording of information on the disc 10. Generally, when a portion of the first or second storage layer 16, 20 exposed to a magnetic field in one of its thickness directions is exposed to a laser beam, that portion of the storage layer 16, 20 is heated and consequently unmagnetized. When the heated portion is cooled, the portion is magnetized in the direction of the magnetic field to which the portion is exposed. Therefore, the recorded area on the storage layer can be erased (magnetized in the same direction normal to the plane of the disc 10) over a desired length by exposing the recorded area to a laser beam continuously produced under the control of the writing control device 44. On the other hand, if an erased or blank area on the storage layer is exposed to a laser beam modulated according to signals from the control device 44, the information corresponding to the signals can be written on that area on the storage layer.

An operation to write information on the magneto-optical memory disc 10 will be described. The first and second storage layers 16, 20 have multiple corresponding pairs of recording areas or segments. In the present specific example, the corresponding pairs of recording segments are located at the corresponding positions on the first and second storage layers 16, 20. For example, if the recording segments are provided in the form of sectors, the corresponding sectors are located at the same circumferential position on the corresponding tracks. Referring to FIGS. 2(a) through 2(g), there are illustrated magnetizing states or recorded signal states on a corresponding pair of recording segments of the first and second storage layers 16, 20. In the figures, small arrows indicate the direction in which individual recording bits are magnetized, while large arrows H indicate the direction of the magnetic field produced by the coil 42. Numerals "0" and "1" in the figures indicate states of the individual bits, and large arrows D indicate the direction in which the optical head 26 and the memory disc 10 are moved relative to each other.

A relative movement between the disc memory 10 and the optical head 26 relative to each other is effected by continuously rotating the memory disc 10 by a suitable drive. FIG. 2(a) shows states of the first and second storage layers 16, 20 before information is written on the memory disc 10. For easier understanding, the initial states of the recording bits on the first storage layer 16 are all "0" while those on the second storage layer 20 are all "1". Upon reception of a command to write new inforamtion, two laser beams are focused on the first and second storage layers 16, 20, respectively, while the bits are successively exposed to the magnetic field produced in the direction H by the coil 42, as indicated in FIG. 2(b). In the present example, the laser beam focused or converged on the first storage layer 16 is modulated according to the information to be recorded. As a result, the information is recorded on the first storage layer 16, while the corresponding segment on the second storage layer 20 is cleared with all the bits magnetized in the same direction, as indicated in FIG. 2(c).

When the writing control device 44 receives a command to write another batch of information on the thus recorded area (recorded pair of segments) of the memory disc 10, the direction of the magnetic field produced by the coil 42 is reversed as indicated by arrow H in FIG. 2(d), and the first storage layer 16 is exposed to a laser beam of a constant intensity while the second storage layer 20 is exposed to a laser beam modulated according to the information to be newly written. As a result, the new information is written on the second storage layer 20 while the first storage layer 16 is cleared.

When still another batch of information is recorded on the same pair of recording segments in the state of FIG. 2(e), the first and second storage layers 16, 20 are exposed to laser beams in the same manner as indicated in FIG. 2(b), whereby the information is written on the first storage layer 16 with a modulated laser beam, as indicated in FIG. 2(g).

It follows from the foregoing description that information is written on one of the first and second storage layers 16, 20 while the other storage layer is cleared. When another batch of information is written, the information is written on the previously cleared storage layer while the previously recorded storage layer is cleared. Hence, a writing operation on the present apparatus does not require a time for an erasing operation prior to initiating a writing operation. This permits an efficient writing operation, as in a conventional recording operation in the "overwriting" manner in which new information is written over a previous recording.

An operation to read information thus recorded on the memory disc 10 may be accomplished as described in patent application, Ser. No. 792,591 filed Oct. 29, 1985, assigned to the assignee of the present application. According to the description in this document, the first and second storage layers 16, 20 are irradiated by respective laser beams having different wavelengths produced by a magneto-optical reading device. The laser beams reflected by the reflector layer 24 are incident upon the reading device, which detects changes in the Kerr rotation angle of the reflected laser beams due to the anisotropy or magnetizing direction of each recording bit. The state of the recorded signals on each of the first and second storage layers 16, 20 is determined based on the amount of change in the Kerr rotation angle. However, it is possible to modify the optical head 26 so as to read information by the head 26. In this case, the optical head 26 includes a half mirror, an analyser, photodiodes and other necessary elements.

Figure 3:
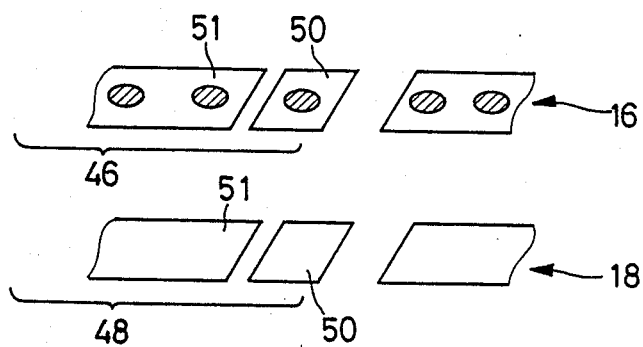
FIG. 3 is an illustration showing recording bits on a memory disc used in another embodiment of the invention.
Figure 4:
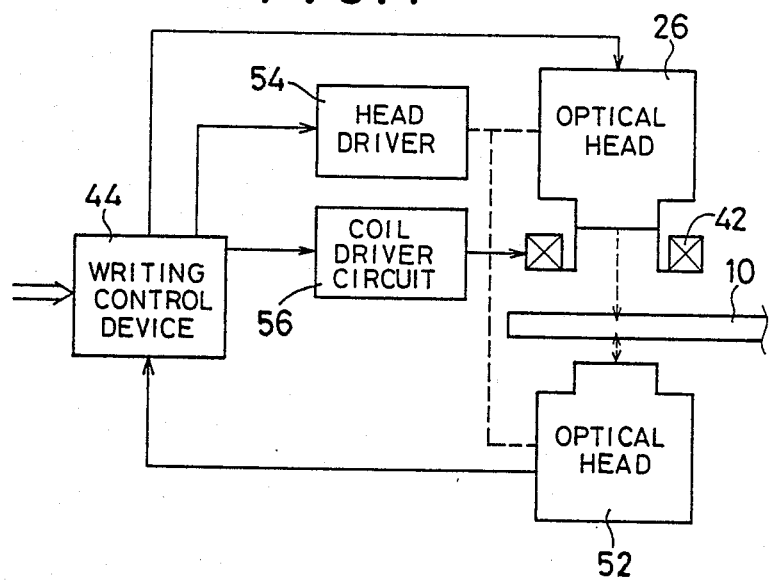
FIG. 4 is a diagram showing a circuit of a recording apparatus of the embodiment of FIG. 3.
Figure 5:
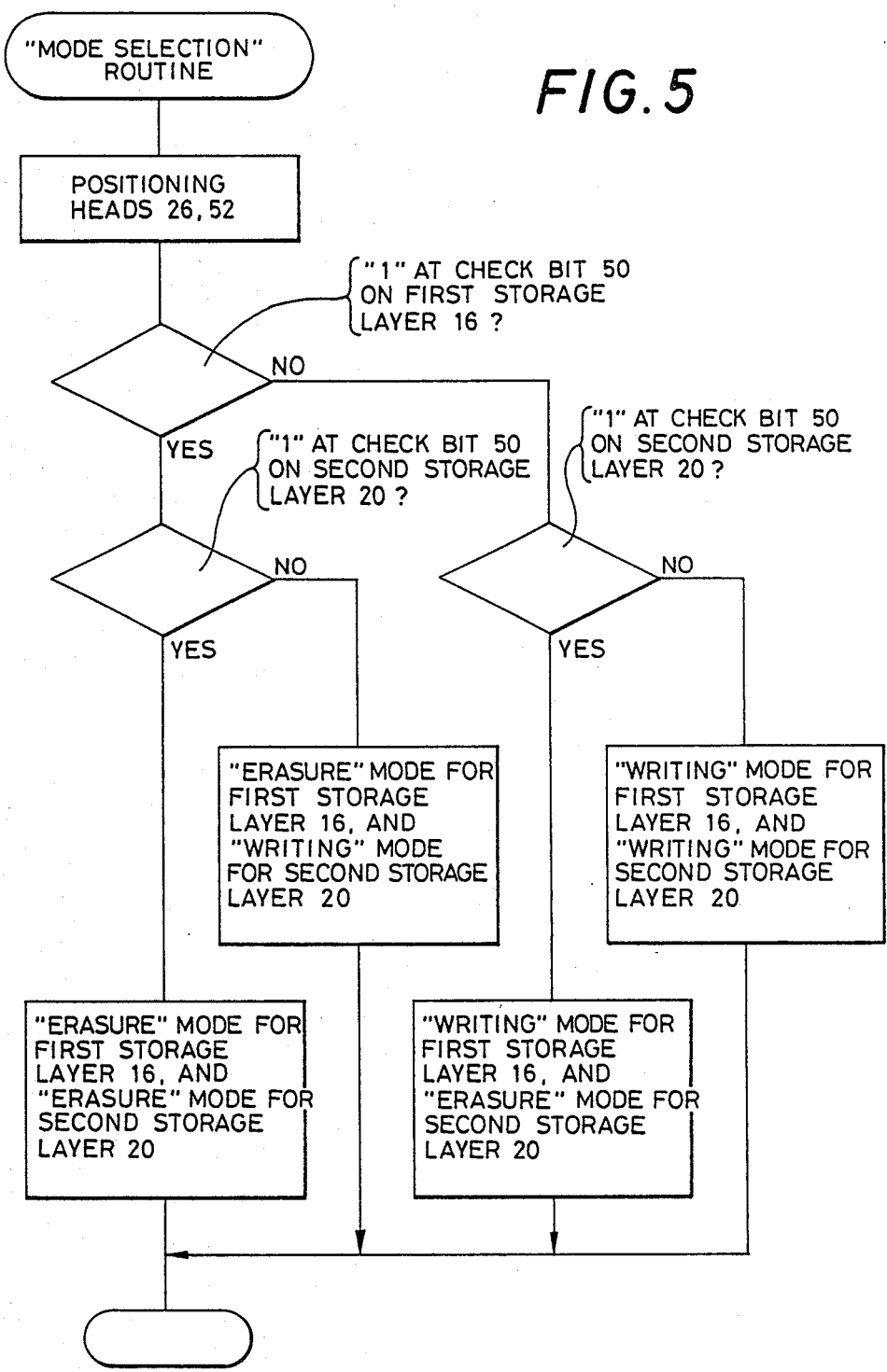
FIG. 5 is a flow chart explaining operations of the apparatus of FIG. 4.

Referring next to FIGS. 3–5, there will be described another embodiment of the present invention. In the interest of brevity and simplification, the same reference numerals as used in FIGS. 1 and 2 will be used in this embodiment to identify the corresponding components, and redundant description of these components is omitted.

As shown in FIG. 3, each of recording segments, for example, each sector 46, 48 of each recording track on the first and second storage layers 16, 20, has at its leading end a check bit 50 which indicates whether information has been written on a series of recording bits 51 following the check bit 50. For instance, "1" is recorded in the check bit 50 when the recording bits 51 are loaded with information. FIG. 4 shows a control circuit adapted to practice this recording method.

In FIG. 4, a magneto-optical reading head 52 reads a recorded signal from the check bit 50, and applies the read signal to the writing control device 44. Actually, the reading head 52 is disposed on the same side of the memory disc 10 as the optical head 26. The head 52 may be incorporated within the optical head 26, if desired. The heads 26 and 52 are positioned to a desired pairs of recording tracks of the memory disc 10, by a head driver 54 under the control of the control device 44. The magnetizing coil 42 is activated to produce a magnetic field according to an electric current supplied from a coil driver circuit 56, under the control of the control device 44, so that the magnetic field is produced in the selected direction, at each recording bit or spot on the appropriate pair of sectors on a corresponding pair of tracks on the first and second storage layers 16, 20.

When signals to be written on the memory disc 10 are fed to the writing control device 44, a MODE SELECTION routine as illustrated in the flow chart of FIG. 5 is executed. Initially, the optical head 26 and the reading head 52 are positioned to a designated pair of tracks of the memory disc 10. At the same time, the memory disc 10 is rotated so that a designated pair of recording segments or sectors 46, 48 of the selected tracks are aligned with the heads 26, 52. Then, the signals at the check bits 50 in the sectors 46 and 48 are read by the reading head 52. If, for example, the signal recorded at the check bit 50 in the sector 46 is "1" while that in the sector 48 is "0", an ERASE mode is established for the sector 46 while a WRITING mode is established for the sector 48. In this case, the information recorded at the recording bits 51 in the sector 46 is erased, while new information is written on the recording bits 51 in the sector 48. Accordingly, the sector 46 is cleared while the sector 48 is loaded with the new information, as indicated in FIG. 2(d). Conversely, if the signal recorded at the check bit 50 in the sector 46 is "0" while that in the sector 48 is "1", the WRITING mode is established for the sector 46 while the ERASURE mode is established for the sector 48. In this case, the sector 48 is cleared while the new information is written on the sector 46, as indicated in FIG. 2(b) or 2(f).

In the case where the signals at the check bits 50 in the sectors 46 and 48 are both "1", the ERASURE mode is selected for both of the sectors 46, 48. If "0" is recorded at the check bits 50 in the sectors 46 and 48, the WRITING mode is selected for both of the sectors 46, 48. These two cases take place where the recording operation is not performed in the "overwriting" manner.

Figure 6:
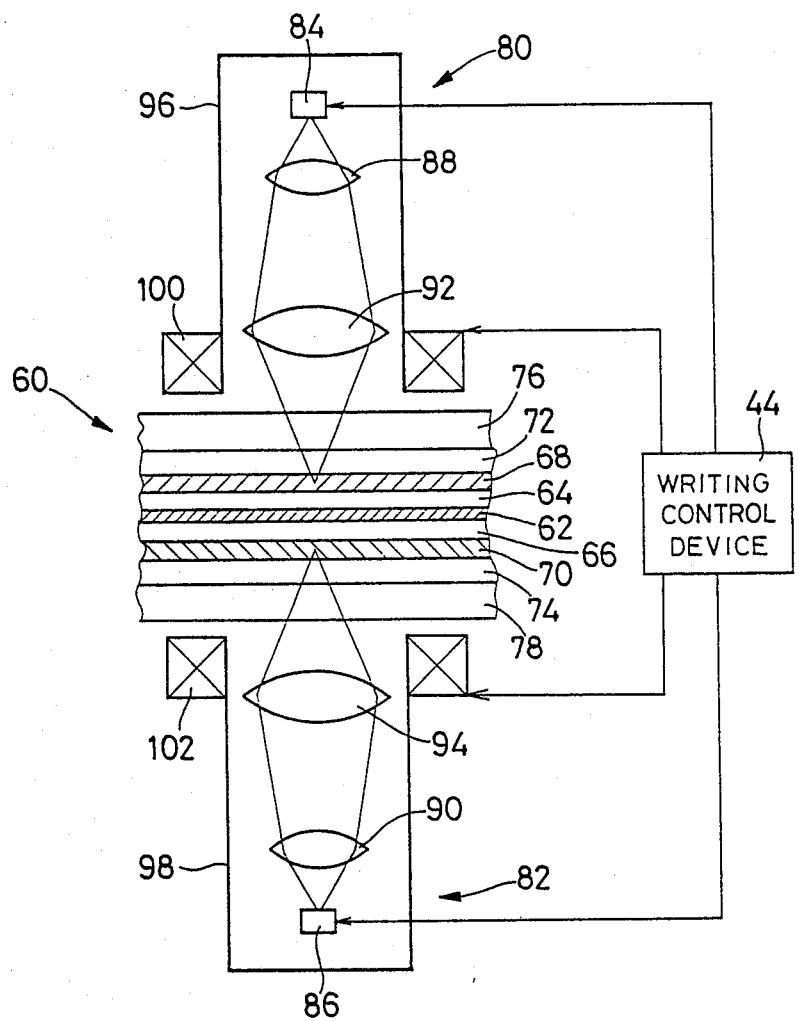
FIG. 6 is a schematic view illustrating a further embodiment of the present invention.

Referring to FIG. 6, a further embodiment of the invention will be described. This embodiment uses a magneto-optical memory disc 60 which includes: an optical shielding layer 62 made of a thin layer of aluminum, copper or other material; a pair of protective layers 64, 66 (non-magnetic layers made of $SiO_2$, or other non-magnetic material) formed on the opposite surfaces of the shielding layer 62; a pair of magneto-optical storage layers made of a magneto-optical material, i.e., first storage layer 68 and a second storage layer 70 formed on the respective protective layers 64, 66; a pair of anti-reflection layers 72, 74 (non-magnetic layers made of $SiO_2$) formed on the respective storage layers 68, 70; and a pair of transparent substrate layers 76, 78 formed on the respective anti-reflection layers 72, 74. On the opposite sides of the memory disc 60, there are disposed a pair of optical heads 80, 82. Thus, the magneto-optical memory disc 60 has the first and second storage layers 68, 70 on the opposite sides of the optical shielding layer 62, which storage layers 68, 70 are accessed by the respective first and second optical heads 80, 82 on the opposite sides of the disc 60. The first and second optical heads 80, 82 serve as first and second read/erasing means, respectively. The first optical head 80 includes a housing 96, a first semiconductor laser element 84, and a lens 88 and an objective lens 92 which are provided for converging a laser beam from the laser element 84, on the first storage layer 68. Similarly, the second optical head 82 includes a housing 98, a second semiconductor laser element 86, and a lens 90 and an objective lens 94 to converge a laser beam from the laser element 86, on the second storage layer 70. These optical heads 80, 82 are provided with respective magnetizing coils 100, 102 attached to the housings 96, 98, for producing magnetic fields in the selected direction at recording spots of the first and second storage layers 68, 70 which are exposed to the laser beams.

Figures 7A, 7B, 7C, 7D:
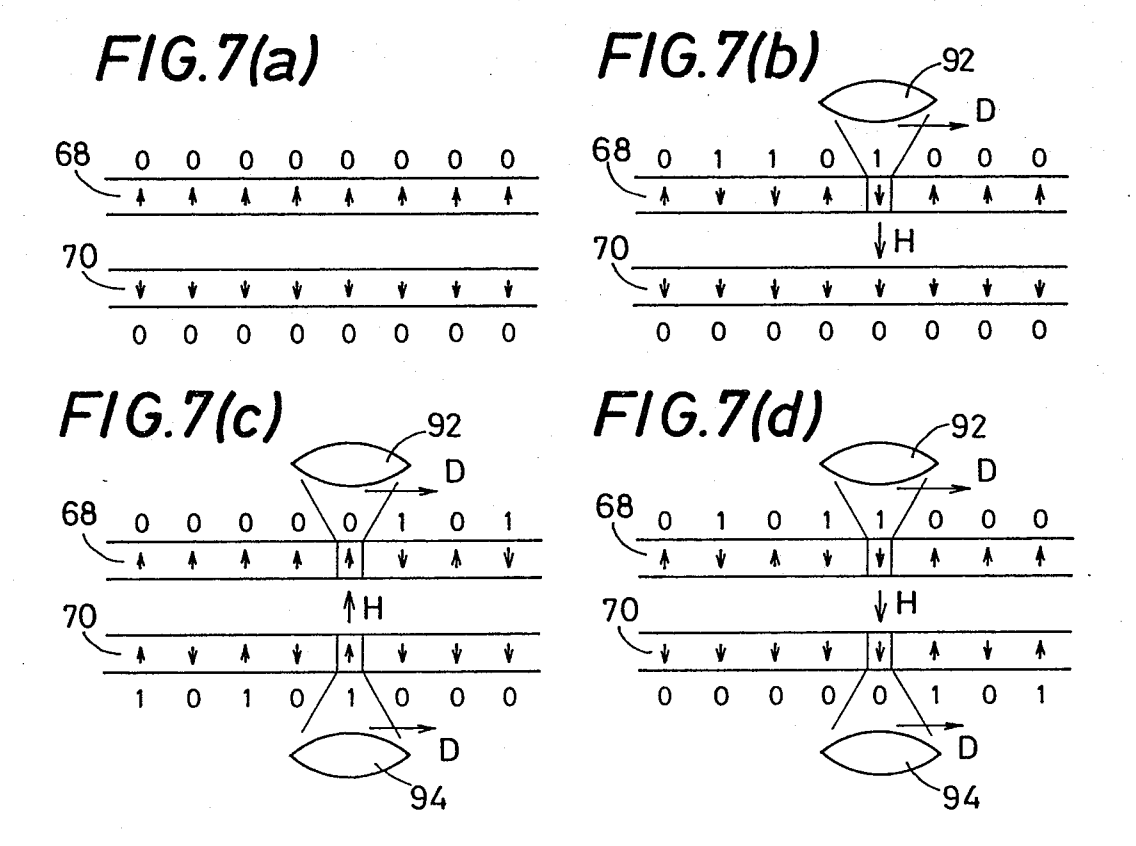

In the instant embodiment, too, the writing control device 44 controls the outputs of the first and second semiconductor laser elements 84, 86, and the directions of the magnetic fields produced by the coils 100, 102, so that an information writing operation may be performed efficiently, in the same manner as described with respect to the preceding embodiments. Stated in greater detail, a writing operation on the memory disc 60 in its cleared state as indicated in FIG. 7(a) can be effected as indicated in FIG. 7(b), by way of example. Namely, the first storage layer 68 is exposed to a laser beam which is emitted by the first optical head 80 so as to be modulated according to desired inforamtion signals to be recorded, while the exposed spots are exposed to a magnetic field in the direction indicated at H. When another batch of information is recorded on the memory disc 60 while erasing the previous recording, the first storage layer 68 is exposed to a laser beam of a constant intensity emitted by the first optical head 80 while the second storage layer 70 is exposed to a modulated laser beam emitted by the second optical head 82, as indicated in FIG. 7(c). As a result, the first storage layer 68 is cleared, while the new information is written on the segment of the second storage layer 70 which corresponds to the cleared segment of the first storage layer 68. When a further batch of information is recorded on the memory disc 60, the first and second storage layers 68, 70 are exposed to the laser beams from the first and second optical heads 80, 82, as indicated in FIG. 7(d). In this case, the first storage layer 68 is loaded with the information while the second storage layer 70 is cleared. The small arrows, large arrows D and H, and numerals "1" and "0" used in FIGS. 7(a) through 7(d) have the same meanings as those of FIGS. 2(a) through (g).

Figure 8:
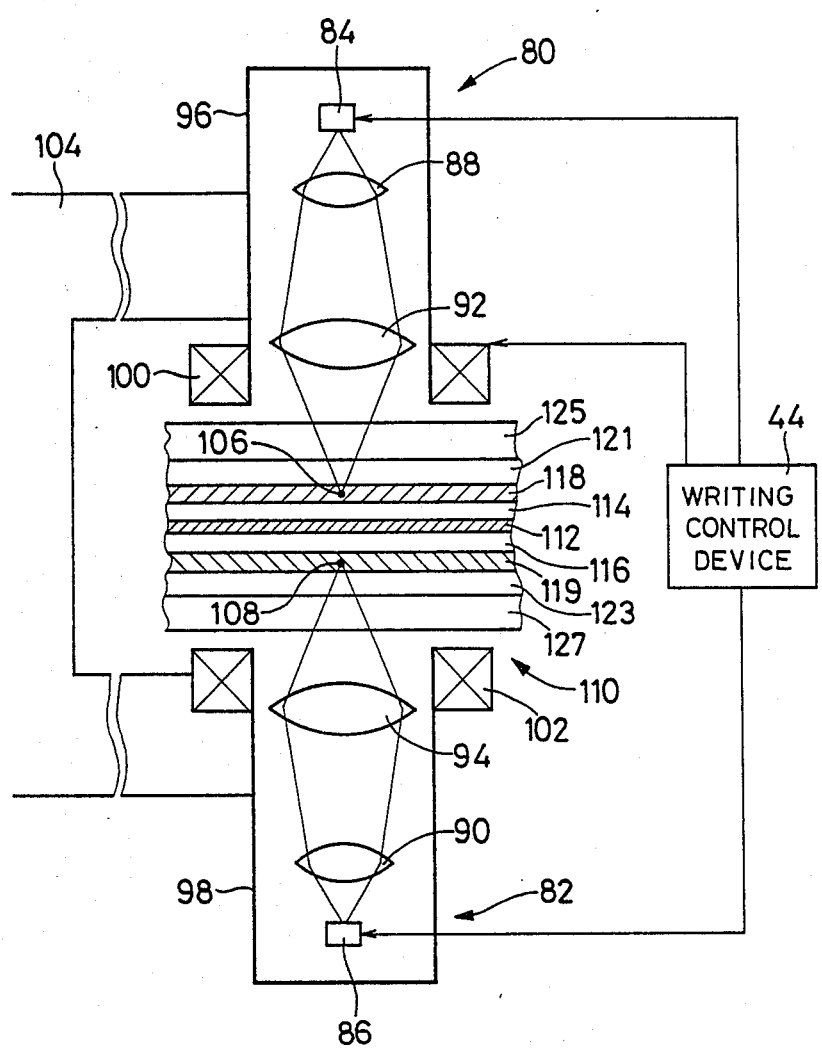
FIG. 8 is a schematic view representing a still further embodiment of the magneto-optical recording apparatus of the invention.

Illustrated in FIG. 8 is a still further embodiment of the invention, which uses a magneto-optical memory disc 110 identical with the memory disc 60, except in that a magnetic shielding layer 112 is used in place of the optical shielding layer 62. Namely, the memory disc 110 have protective layers 114, 116, first and second magneto-optical storage layers 118, 119, anti-reflection layers 121, 123, and transparent substrate layers 125, 127, which are all identical with the corresponding layers of the memory disc 60. The magnetic shielding layer 112 is preferably made of a material having a high magnetic permeability, such as iron, nickel alloys, Permalloy or Sendalloy. The shielding layer 112 has a thickness of about 0.05–10 microns. The shielding layer 112 may be formed of a powdered adhesive agent containing high permeability. If needed, a plurality of magnetic shielding layers may be formed between the first and second storage layers 118, 119. Further, the shielding layer 112 may consist of two layers which are bonded together. The first and second optical heads 80, 82 used in the instant embodiment are supported by a single common holder 104, such that two focal points 106, 108 at which the laser beams emitted by the heads 80, 82 are converged on the first and second storage layers 118, 119, are aligned with each other, as viewed in a plane parallel to the plane of the memory disc 110. The holder 104 is moved by a driving device, in a direction parallel to the memory disc 110, so that the focal points 106, 108 are moved in the radial direction of the disc 110, to a desired recording track of the disc 110. However, the first and second optical heads 80, 82 may be supported by separate holders, so that the two heads may be positioned independently of each other.

In the instant embodiment, the two optical heads 80, 82 are operated simultaneously, to write information on one of the first and second magneto-optical storage layers 118, 119 of the memory disc 110, while clearing the other storage layer 118, 119. Although magnetic fields are produced by the two magnetizing coils 100, 102, independently of each other, these magnetic fields will not interfere with each other, since the magnetic shielding layer 112 is interposed between the first and second storage layers 118, 119. Namely, one of the two optical heads 80, 82 acts on one of a pair of corresponding segments of the first and second storage layers 118, 119, while the other optical head 80, 82 acts on the other segment. Thus, the information may be efficiently written on the memory disc 110, without having to effect an erasing operation prior to a writing operation. Further, the instant recording apparatus permits a reduced access time, as compared with an apparatus wherein one of two optical heads is temporarily held at rest, in order to avoid an interference between the two heads.

Figure 9:
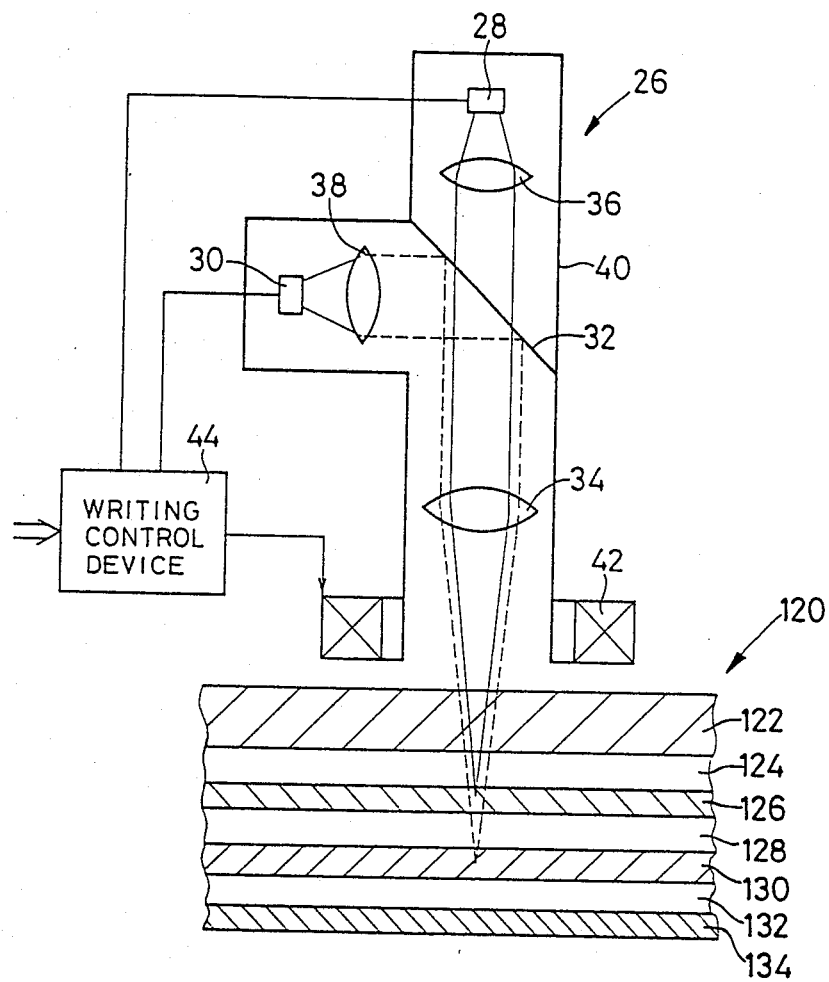
FIG. 9 is a schematic view representing a yet further embodiment of the invention.

Referring to FIG. 9, there is shown an arrangement wherein information is written on a magneto-optical disc 120 by the recording apparatus of FIG. 1, rather than on the memory disc 10. The memory disc 120 is a laminar structure which consists of a transparent substrate layer 122, a protective layer 124, a first magneto-optical storage layer 126, an intermediate non-magnetic layer 128, a second magneto-optical storage layer 130, a non-magnetic layer 132 and a reflector layer 134, the last six layers 124, 126, 128, 130, 132 and 134 being superposed one on another in the order of description, on one surface of the substrate layer 122. The transparent substrate layer 122 is preferably formed of a glass material, or a transparent resin material such as acrylic resin and PMMA. The protective layers 124, 132 and the intermediate layer 128 are preferably made of a transparent non-magnetic dielectric material such as aluminum nitride, silicon oxide or silicon dioxide, or a material such as silicon nitride which has a comparatively low degree of absorption of visible rays or near infrared rays. The first magneto-optical storage layer 126 is preferably made of a transparent magnetic material such as $Gd_2Bi_1$, $FeO_{12}$. However, the first storage layer 116 may be made of other transparent magnetic materials having a magneto-optical effect, which includes a magnetic garnet such as $Gd_3Fe_5O_{12}$ and YIG ($Y_3Fe_5O_{12}$), or orthoferrite such as $FeBO_3$. The second magneto-optical storage layer 130 is preferably made of a highly magneto-optical material such as rare earth metals and amorphous films as described in connection with the embodiment of FIG. 1, but may also be made of a transparent magnetic material as indicated above. The reflector layer 134 is usually a film formed by vapor deposition of aluminum.

The $Gd_2Bi_1FeO_{12}$ used for the first storage layer 126 may, for example, consist of LPE (liquid phase epitaxy) formed on a non-magnetic garnet such as GGG, YAG, or may alternatively be formed by sputtering on a glass substrate, and subsequent heat treatment for crystallization.

Figure 10:
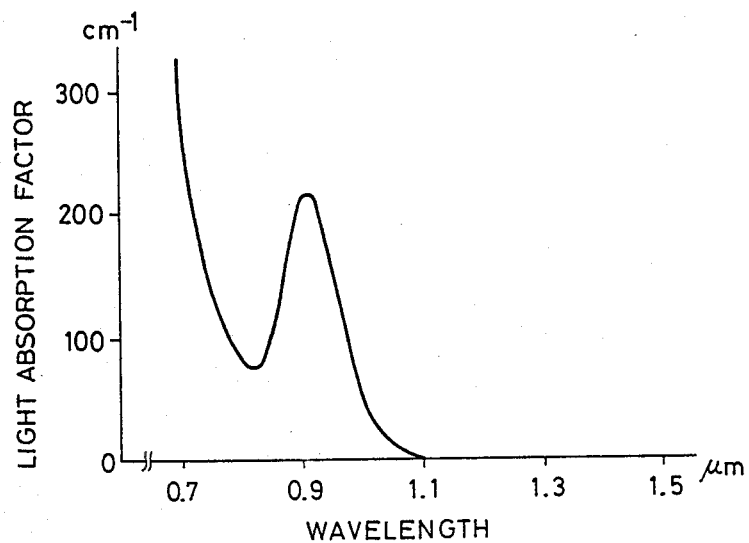
FIG. 10 is a graph indicating light absorption characteristic of a first storage layer of a magneto-optical memory disc used in the embodiment of FIG. 9, which storage layer is made of $Gd_2Bi_1Fe_5O_{12}$.
Figure 11:
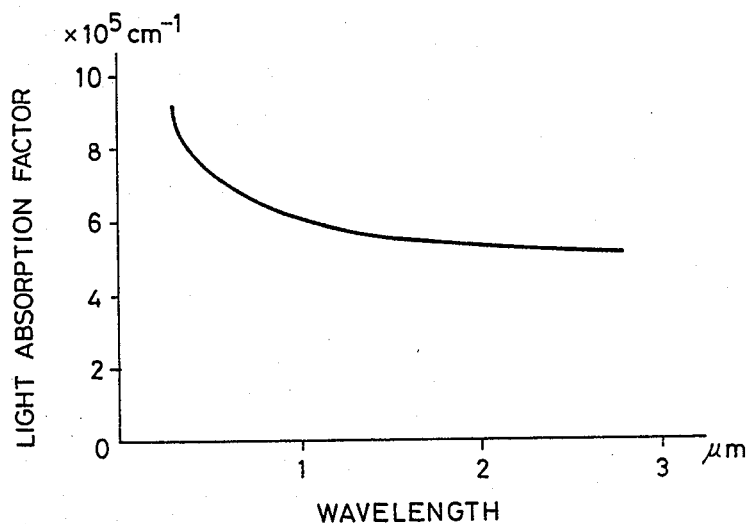
FIG. 11 is a graph indicating light absorption characteristic of a TbFe storage layer usually provided on an ordinary magneto-optical memory disc.

The memory disc 120 using the first storage layer 126 made of a transparent magnetic material requires the second semiconductor laser element 30 to provide a reduced output for exposing the second storage layer 130, as compared with a memory disc which does not have such a transparent magnetic first storage layer. Further, the memory disc 120 may have an increased number of storage layers that can be properly exposed to laser beams, without increasing the output capacity of the light source. Referring to FIGS. 10 and 11, the graphs respectively show light absorption factors of the $Gd_2Bi_1FeO_{12}$ of the first storage layer 126, and TbFe commonly used for a conventional memory disc. The graphs reveal that the light absorption factor of the $Gd_2Bi_1FeO_{12}$ is less than 1/1000 of that of the TbFe.

This means that the amount of light absorption by the first storage layer 126 is so small as to be substantially negligible, and that the above-mentioned advantage of using the $Gd_2Bi_1FeO_{12}$ can be fully enjoyed.

While the memory disc 120 uses the two magneto-optical storage layers 126, 130, the disc 120 may include three or more storage layers. Since the transparent magnetic material of the first storage layer 126 is usually an oxide, the protective layer 124 for avoiding oxidation of the storage layer 126 may be removed. For reading information from the memory disc 120, a laser beam having a wavelength of 0.78 micron and a laser beam having a wavelength of 0.83 micron are used, for example, as described in laid-open publication No. 61-107502 (published in 1986) of Japanese Patent Application. However, it is desirable that one of the laser beams has a wavelength of at least 1.1 micron, since the light absorption of the first storage layer 126 is substantially zero.

It is noted that while the laser beams emitted by the first and second semiconductor laser elements 28, 30 of the optical head 26 in the embodiment of FIG. 1 are focused on the respective first and second storage layers 16, 20 through different optical systems, the laser elements 28, 30 may be adapted to emit laser beams having different wavelengths. In this case, the first and second laser elements may use the same optical system for converging the laser beams on the first and second storage layers 16, 20.

The optical head 26 of FIG. 1 may be replaced by a pair of optical heads disposed on the same side of the memory disc 10, for irradiating the first and second storage layers 16, 20. In this case, each of the two heads has a semiconductor laser element, a magnetizing coil, and other necessary components. Further, the two heads are supported for movements as a unit in the radial direction of the memory disc 10, preferably such that one of the heads is positioned at a radially outer portion of the disc 10 while the other head is positioned at a radially inner portion of the disc 10 which is diametrically opposite with respect to the radially outer portion at which the above one head is located. In the present arrangement, the first and second storage layers have pairs of corresponding first and second recording segments which are located so that the corresponding two segments can be accessed by the respective heads.

Although the optical axes of the laser beams directed to the first and second storage layers are alinged with each other in the embodiments of FIGS. 1 and 6, the two laser beams may be directed to the two storage layers through different paths.

While the memory disc 60 of FIG. 6 has the optical shielding layer 62, this layer may be eliminated if the first and second storage layers 68, 70 have a sufficiently large thickness.

Further, the relation between the magnetizing direction of each recording bit of each storage layer of the memory disc, and the logical state "0" and "1" of signals to be recorded, may be determined as needed.

Figure 12:
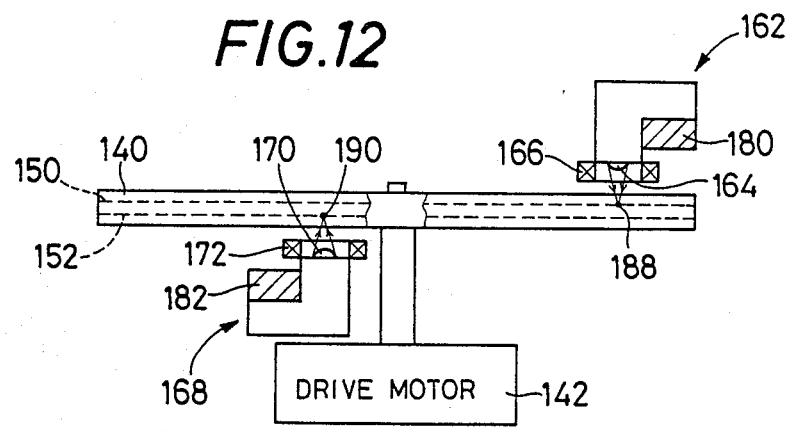
FIG. 12 is a front elevational view of another embodiment of the recording apparatus of the invention.
Figure 14:
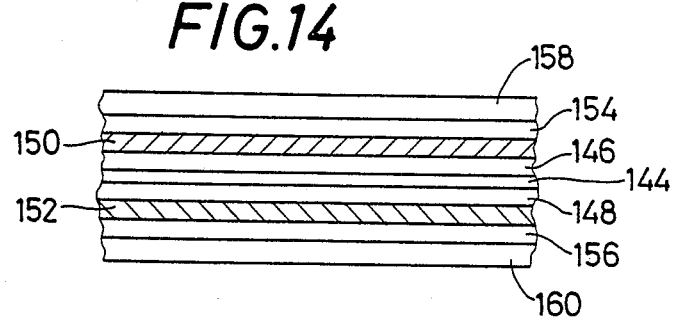
FIG. 14 is a view showing a magneto-optical memory disc used on the apparatus of FIGS. 12 and 13.

Referring to FIGS. 12-14, yet another embodiment of the present invention will be described.

The present embodiment uses a magneto-optical memory disc 140 rotated about its axis by a drive motor 142. The memory disc 140 is a laminar structure consisting of a pair of non-magnetic layers 146, 148, a pair of magneto-optical storage layers (first and second storage layers) 150, 152, a pair of non-magnetic layers 154, 156, and a pair of transparent substrate layers 158, 160, which are superposed on each other on the opposite surfaces of a bonding layer 144, as shown in detail in FIG. 14. The transparent substrate layers 158, 160, non-magnetic layers 146, 148, 154, 156 and first and second storage layers 150, 152, are made of the materials described with respect to the memory disc 10 used in the embodiment of FIG. 1. The bonding layer 144 is made of a well known bonding agent such as a rubbery adhesive. This bonding layer 144 bonds an assembly of the first transparent substrate layer 158 on which are superposed the non-magnetic layer 154, first storage layer 150 and non-magnetic layer 146, and another assembly of the second transparent substrate layer 160 on which are superposed the non-magnetic layer 156, second storage layer 152 and non-magnetic layer 148. If needed, a reflector layer such as an aluminum vapor-deposited layer may be interposed between the bonding layer 144, and each of the non-magnetic layers 146, 148.

A first optical head 162 and a second optical head 168 are disposed so as to face the opposite surfaces of the memory disc 140. The first optical head 162 includes a semiconductor laser element, an objective lens 164 for converging a laser beam from the laser element, at a point on the first storage layer 150, and a first annular magnetizing coil 166 fixedly disposed radially outwardly of the objective lens 164. Similarly, the second optical head 168 includes a semiconductor laser element, an objective lens 170 for converging a laser beam from this latter laser element, at a point on the second storage layer 152, and a second annular magnetizing coil 172 disposed radially outwardly of the objective lens 170.

Beside the memory disc 140, there is disposed a holder 183 which includes a carriage 178 and a pair of arms 180, 182 extending from the carriage 178, as illustrated in FIG. 13. The carriage 178 is slidably supported by a pair of guide rods 174, 176 which extend in a direction perpendicular to the axis of rotation of the memory disc 140. The arms 180, 182 support at their free ends the first and second optical heads 162, 168, respectively, such that the heads 162, 168 are moved on a straight line passing the axis of rotation of the disc 140, one head being located on one side of the axis and the other head on the other side of the axis. The carriage 178 engages a feedscrew 186 coupled directly to an output shaft of a stepping motor 184. With the stepping motor 184 activated, active recording spots or bits on the first and second storage layers 150, 152, i.e., focal points 188, 190 at which the laser beams are converged on the storage layers 150, 152, are moved along a first and a second path 192, 194 on the straight line passing the axis of rotation of the disc 140. Thus, the stepping motor 184, feedscrew 186, etc. constitute first and second positioning means for positioning the first and second optical heads 162, 168 in the radial direction of the memory disc 140, so that the focal point 190 on the second path 194 described by the second optical head 168 is positioned at a radially inner portion of the disc 140 while the focal point 188 on the first path 192 described by the first optical head 162 is positioned at a radially outer portion of the disc 140, for example.

Each of the first and second storage layers 150, 152 of the magneto-optical disc 140 has a multiplicity of concentric recording tracks or a single spiral track, which are/is formed so as to intersect the paths 192, 194 of the heads 162, 168. Where the spiral tracks are provided, the spirals on the first and second storage layers 150, 152 are formed in opposite directions (left and right spirals) as viewed from the heads 162, 168 toward the surfaces of the disc 140. The concentric tracks or spiral track on one of the storage layers 150, 152 have/has a multiplicity of recording segments, which correspond to a multiplicity of recording segments provided on the other storage layer.

When information is written on the memory disc 140, the writing control device 196 activates the stepping motor 184 so that the first and second optical heads 162, 168 are positioned at a selected pair of recording segments. The information is written on the recording segment on the first or second storage layer 150, 152 which has been cleared in the last recording cycle. For example, the information is written on the previously cleared recording segment on the first storage layer 150. In this case, the first magnetizing coil 166 of the first optical head 162 is energized to expose the recording segment on the first storage layer 150, to a magnetic field of a given direction. In the meantime, a laser beam modulated according to signals to be newly recorded is applied from the first optical head 162 to the first storage layer 150, under the control of the control device 196. The exposed spots are heated and unmagnetized, and then re-magnetized in the direction of the magnetic field after the heated spots are cooled. Thus, the desired inforamtion signals are recorded in the selected recording segment on the first storage layer 150, by the first optical head 162. Simultaneously, the control device 196 controls the second magnetizing coil 172 to produce a magnetic field in the direction for clearing the corresponding recording segment on the second storage layer 152. In this condition, the second optical head 168 emits a laser beam of a constant intensity to irradiate the recording segment on the second storage layer 152, so that each of the recording spots or bits is magnetized in the same direction by the magnetic field produced by the second coil 172. Thus, the previous recording on the segment on the second storage layer 152 is erased. When the next recording operation is required for the same pair of recording segments on the disc 140, the information is written on the second storage layer 152 while the first storage layer 150 is cleared. In this manner, the storage layers 150, 152 are alternately loaded with new information. Namely, one of the first and second storage layers 150, 152 is cleared while the writing of information is conducted on the other storage layer. Hence, no time is required for clearing the previous information before new information is written on the disc 140.

As the information writing operation proceeds, the first and second optical heads 162, 168 are moved with the focal points 188, 190 following the first and second paths 192, 194, while maintaining a predetermined distance between the two heads 162, 168 (between the two focal points 188, 190). Hence, the first and second magnetizing coils 166, 172 do not approach each other, in a plane parallel to the disc 140, whereby the magnetic fields produced by these two coils do not interfere with each other.

In the absence of an interference of the two magnetic fields produced by the coils 166, 172, the first and second optical heads 162, 168 can be operated to write information, independently of each other. Therefore, the optical heads 162, 168 can also be used to write information on both surfaces of the disc 140, if desired, as well as to write on one of the surfaces of the disc according to the present invention.

The information recorded on the disc 140 may be read out by a suitable reading device which detects a change in the angle of the Kerr rotation between a laser beam of a predetermined wavelength incident upon the first or second storage layer 150, 152, and a laser beam reflected by the disc 140, as previously described.

Figure 15:
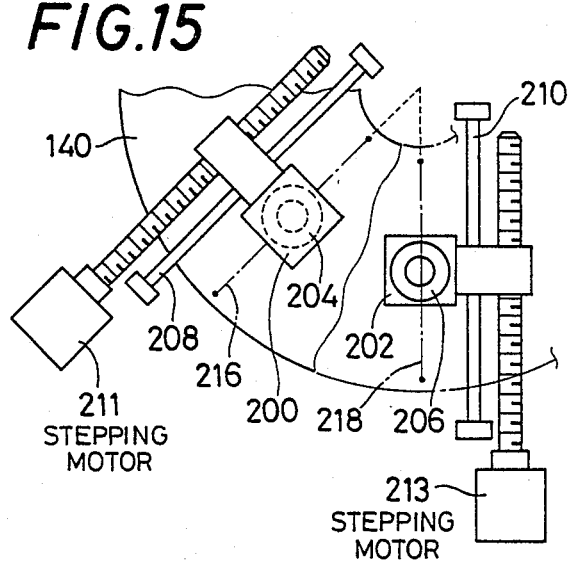
FIG. 15 is a fragmentary plan view of a further embodiment of the invention.
Figure 16:
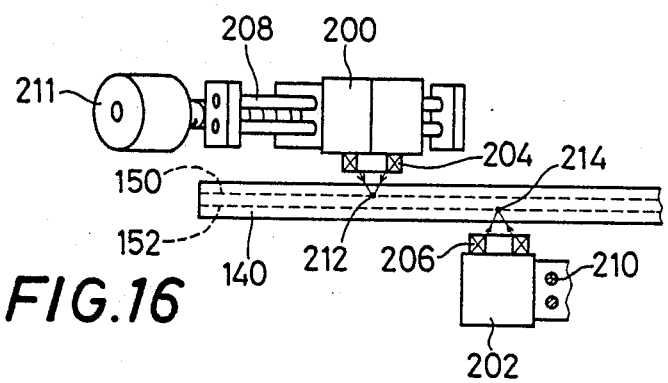
FIG. 16 is a front elevational view of the embodiment of FIG. 15.

Referring further to FIGS. 15 and 16, there is shown another modified embodiment of the invention, wherein first and second optical heads 200, 202 are provided with first and second magnetizing coils 204, 206, respectively, and are moved in the radial direction of the disc 140 while being slidably supported by guide rods 208, 210, as in the preceding embodiment of FIGS. 12-14. The first and second optical heads 200, 202 are engaged with respective feedscrews directly coupled to the output shafts of first and second stepping motors 211, 213, whereby the heads 200, 202 are positioned by the stepping motors 211, 213 in the radial direction of the memory disc 140. Thus, the first and second stepping motors 211, 213 constitute major parts of first and second positioning means for moving the heads 200, 202, so that focal points 212, 214 of the heads 200, 202 are moved along respective first and second paths 216, 218 which extend radially of the disc 140 such that their lines of extension intersect each other at the axis of rotation of the disc 140. While the first and second heads 200, 202 approach each other as they move toward the center of the disc 140, the minimum distance between the focal points 212, 214 is large enough to avoid an interference between the two magnetic fields produced by the first and second coils 204, 206.

Figure 17:
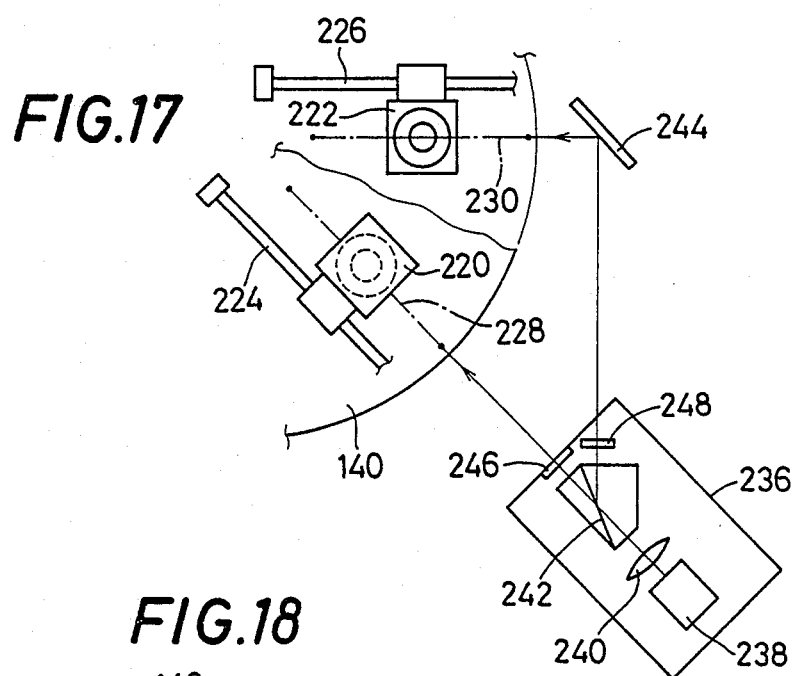
FIG. 17 is a fragmentary view of a still further embodiment of the present invention.
Figure 18:
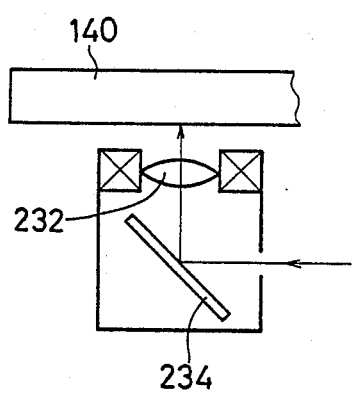
FIG. 18 is a view depicting an arrangement for moving an optical head of FIG. 17.

A further modified embodiment is illustrated in FIG. 17, wherein first and second optical heads include movable parts 220, 222, respectively. The movable parts 220, 222 are slidably guided by guide rods 224, 226, in the radial direction of the memory disc 140, as in the preceding embodiments of FIGS. 12-14 and FIGS. 15-16. The focal points formed on the first and second storage layers 150, 152 by the first and second heads are moved by stepping motors (not shown) similar to those of FIGS. 15-16, along first and second paths 228, 230 whose geometrical relation is similar to that of the first and second paths 216, 218 of FIGS. 15-16.

The movable parts 220, 222 of the first and second optical heads are identically constructed. For instance, each of the movable parts 220, 222 has an objective lens 232 disposed opposite to the disc 140, and a mirror 234 for reflecting incident light parallel to the first and second paths 228, 230, into alignment with an optical axis of the objective lens 232. The movable parts 220, 222 cooperate with a stationary head body 236 to constitute the first and second optical heads. The stationary head body 236 includes a light source element 238, a collimator lens 240 and a composite mirror 242. A light beam generated by the light source element 238 is passed through the composite mirror 242, and emitted through a first modulator 246 toward the movable part 220 of the first optical head, in a direction parallel to the first path 228. At the same time, the light beam incident upon the composite mirror 242 is also directed toward a stationary mirror 244 through a second modulator 248. The beam incident upon the stationary mirror 244 is reflected by the same toward the movable part 222 of the second optical head, in a direction parallel to the second path 230.

In the instant recording apparatus, the focal points of the movable parts 220, 222 of the first and second optical heads are moved along the first and second radial paths 228, 230, relative to the memory disc 140. However, like the first and second optical heads 200, 202 of the preceding embodiment of FIGS. 15-16, the movable parts 220, 222 are prevented from approaching each other to such an extent as to cause an interference between the magnetic fields produced by their coils. Further, since the movable parts 220, 222 incorporate only the objective lens 232 and the mirror 234 as optical elements, the weight of the movable parts is reduced whereby the access speed of the optical heads can be increased.

Referring back to the embodiment of FIG. 12, each of the first and second optical heads 162, 168 may incorporate a half mirror, a detector lens, an analyser, a photosensitive element, and other components, which are necessary to read information from the memory disc 140.

In the embodiment of FIGS. 15-16, the first and second paths 216, 218 taken by the heads 200, 202 may be parallel to each other, provided that these paths 216, 218 do not intersect each other, at any points which fall within the effective information recording areas of the memory disc 140.

While the memory disc 140 used in the last three embodiments has a single magneto-optical storage layer on each of its opposite surfaces, it is possible that two or more storage layers are provided on each surface of the disc 140.

Figure 19:
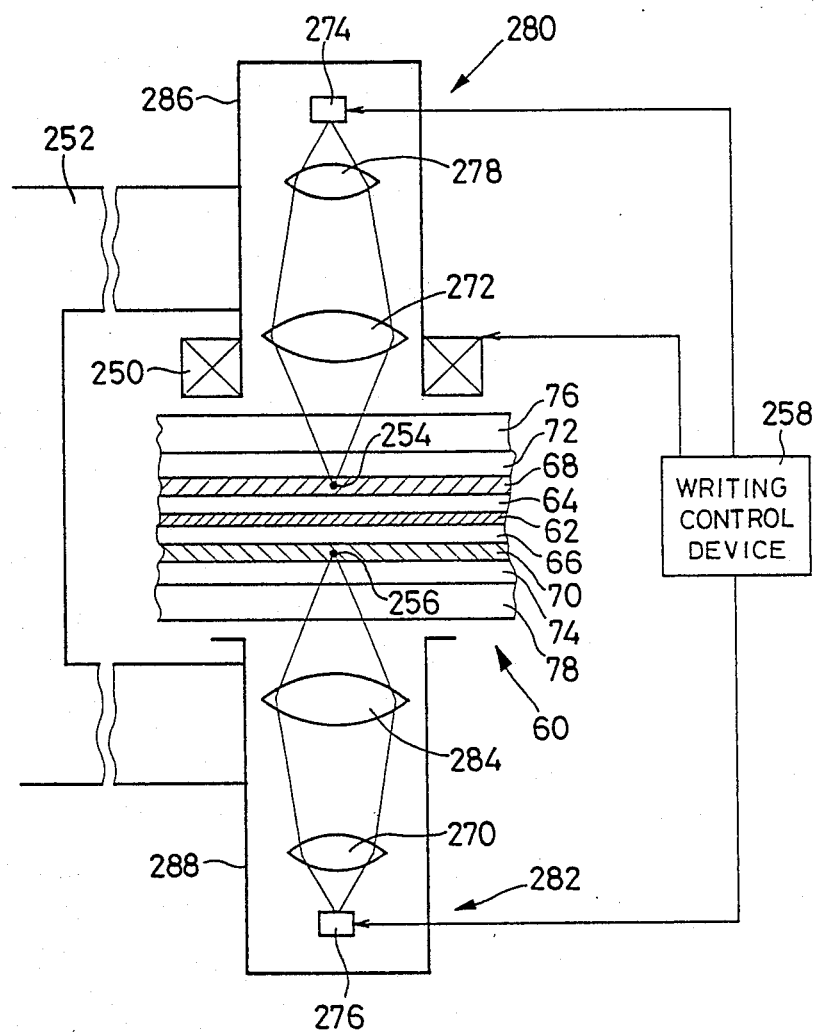
FIG. 19 is a schematic view illustrating a yet further embodiment of the invention.

Referring next to FIG. 19, there is shown a further modified information recording arrangement having first and second optical heads 280, 282 whose semiconductor laser elements 274, 276, lenses 270, 278, objective lenses 272, 284, and housings 286, 288, are identical with those of the embodiment of FIG. 8. The instant recording apparatus is different from that of FIG. 8, only in that only the first optical head 280 is provided with the magnetizing coil 250 attached to its housing 286, for magnetizing the first and second magneto-optical storage layers 68 and 70 of the memory disc 60 (constructed as shown in FIG. 6), in predetermined one of opposite directions perpendicular to the plane of the disc 60. The first and second optical heads 280, 282 are mounted on a holder 252 such that focal points 254, 256 formed on the first and second storage layers 68, 70 are aligned with each other in a plane parallel to the plane of the disc 60. The holder 252 is moved by a suitable drive device (not shown) in a direction parallel to the disc 60, so that the focal points 254, 256 may be positioned at desired one of multiple concentric recording tracks, or at a desired portion of a single spiral track. The concentric tracks or spiral track on the first storage layer 68 accessed by the first optical head 280 have/has a multiplicity of recording sectors or segments which correspond to a multiplicity of recording sectors or segments provided on the second storage layer 256 accessed by the second optical head 282.

Figures 20A, 20B, 20C, 20D:
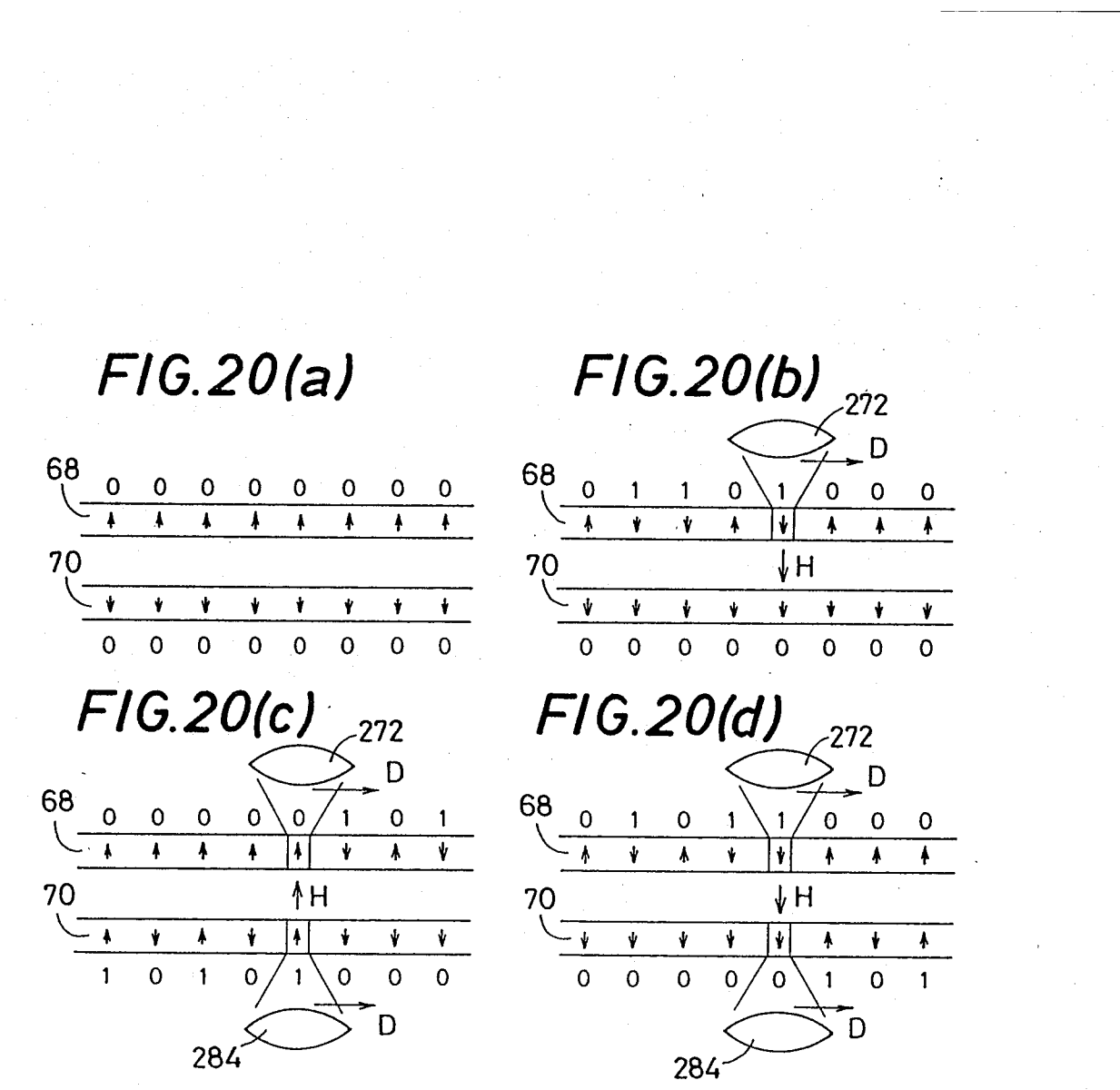

The intensity of the laser beams emitted by the semiconductor laser elements 274, 276 of the optical heads 280, 282, and the direction of a magnetic field produced by the common coil 250, are controlled by a writing control device 258. Described more specifically, a writing operation on the memory disc 60 in its cleared state as indicated in FIG. 20(a) can be effected as indicated in FIG. 20(b), by way of example. Namely, the first storage layer 68 is exposed to a laser beam which is emitted by the first optical head 280 while being modulated according to desired information signals to be recorded. Simultaneously, the exposed spots are exposed to a magnetic field in the direction indicated at H, so that the exposed and heated spots are magnetized upon cooling, in the same direction as the direction of the magnetic field produced by the coil 250. When another batch of information is recorded on the memory disc 60 while erasing the previous recording, the first storage layer 68 is exposed to a laser beam of a constant intensity emitted by the first optical head 280 while the second storage layer 70 is exposed to a modulated laser beam emitted by the second optical head 282, as indicated in FIG. 20(c). As a result, the first storage layer 68 is cleared, while the new information is written on the segment of the second storage layer 70 which corresponds to the cleared segment of the first storage layer 68. The recording segment of the second storage layer 70 on which the information is written as indicated in FIG. 20(c) has been cleared in the last recording operation as indicated in FIG. 20(b). When a further batch of information is recorded on the memory disc 60, the first and second storage layers 68, 70 are exposed to the laser beams from the first and second optical heads 280, 282, as indicated in FIG. 20(d). In this case, the first storage layer 68 is loaded with the information while the second storage layer 70 is cleared.

Thus, the present embodiment also permits an efficient information writing operation on one of the first and second storage layers 68, 70 while simultaneously clearing the other storage layer.

While the focal points 254, 256 of the first and second optical heads 280, 282 are precisely aligned with each other in the plane parallel to the disc 60, it is suffice that these points are located in an area which is effectively exposed to the magnetic field produced by the coil 250.

Figure 21:
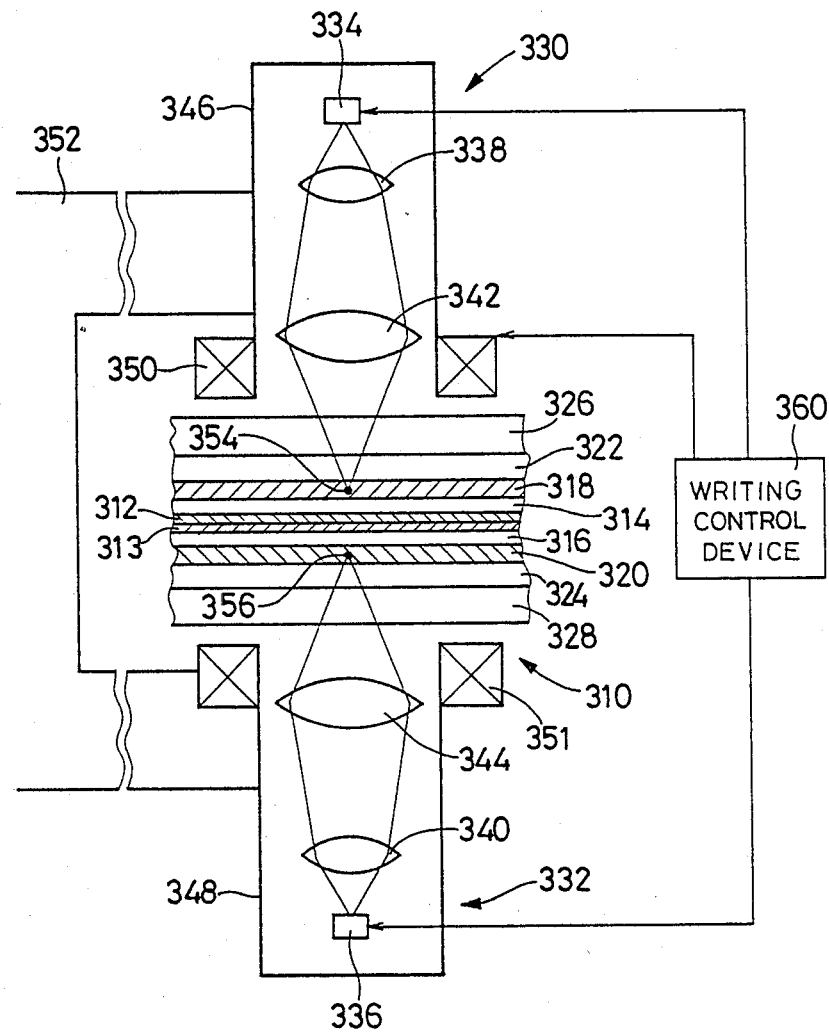
FIG. 21 is a view illustrating yet another embodiment of the invention.

Referring to FIG. 21, there is shown a magneto-optical memory disc 310 rotated about its axis by a suitable drive device. The memory disc 310 consists of a pair of reflector layers 312, 313 bonded together with a thin aluminum or copper layer, and a pair of laminar assemblies formed on the opposite exposed surfaces of the reflector layers 312, 313. Each laminar assembly consists of a protective (non-magnetic layer) 314, 316, a first or second magneto-optical storage layer 318, 320, an anti-reflection (non-magnetic) layer 322, 324, and a transparent substrate layer 326, 328, which layers are superposed on each other in the order of description. A first optical head 330 and a second optical head 332 are disposed on opposite sides of the memory disc 310. The first and second optical heads 330, 332 respectively include first and second semiconductor laser elements 334, 336, and lenses 338, 340 and objective lenses 342, 344 for converging laser beams from the laser elements 334, 336, on the respective first and second storage layers 318, 320. These elements of the heads 330, 332 are all accommodated in respective housings 346, 348. The optical heads 330, 332 are provided with respective magnetizing coils 350, 351 attached to their housings 346, 348, for producing magnetic fields in one of opposite directions perpendicular to the plane of the disc 310.

As in the preceding embodiment, the first and second optical heads 330, 332 are mounted on a common holder 352 such that focal points 354, 356 formed on the first and second storage layers 318, 320 are substantially aligned with each other in the plane parallel to the disc 310. The holder 352 is moved by a suitable drive device, in a direction parallel to the memory disc 310, so that each focal point 354, 356 is positioned at a desired recording segment of a single spiral track 358 on each storage layer 318, 320.

Figure 22:
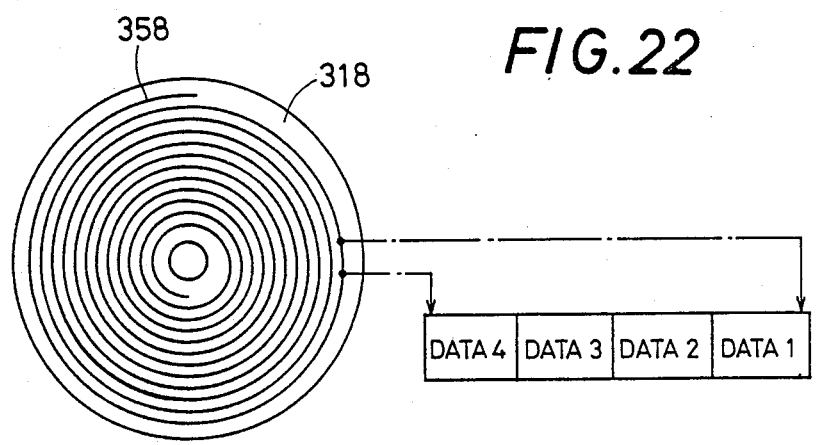
FIG. 22 is a top plan view of a memory disc used for the embodiment of FIG. 21.
Figure 23:
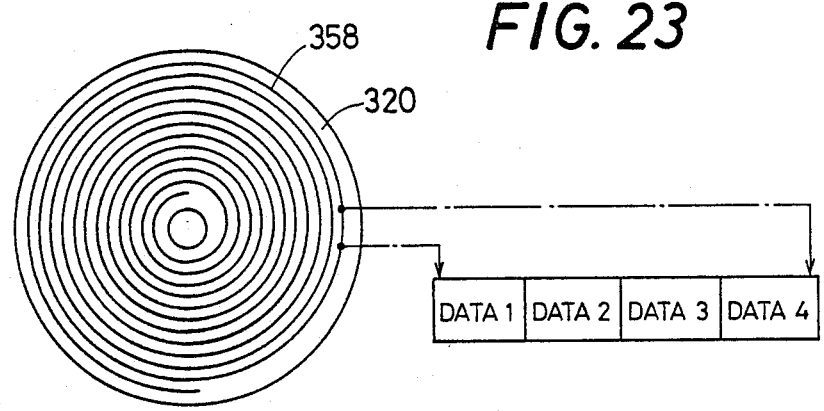
FIG. 23 is a bottom plan view of the memory disc of FIG. 22.

The spiral tracks 358 formed on the first and second storage layers 318, 320 are shown in the top and bottom plan views of the memory disc 310 of FIGS. 22 and 23. The spiral track 358 on the first storage layer 318 is formed in the right or clockwise direction as viewed in FIG. 22, while the spiral track 358 on the second storage layer 320 is formed in the left or counterclockwise direction as viewed in FIG. 23. Accordingly, information is written in opposite directions on the first and second storage layers 318, 320. For example, DATA 1, DATA 2, DATA 3 and DATA 4 are written in the order of description in the clockwise direction on the first storage layer 318, as indicated in FIG. 22. However, these data groups are written in the counterclockwise direction on the second storage layer 320, as indicated in FIG. 23. Namely, the direction of recording is the same for the first and second storage layers 318, 320, as viewed in one direction along the axis of rotation of the memory disc 310.

The outputs of the first and second semiconductor laser elements 334, 336, and the direction of the magnetic fields of the coils 350, 351, are regulated by a writing control device 360. Since the information writing direction is the same for the spiral tracks 358 on the first and second storage layers 318, 320, as viewed in one direction toward the memory disc 310, the information writing and erasing operations on the first and second storage layers 318, 320 may be effected by the first and second optical heads 330, 332, while the disc 310 is rotated in the same direction. This arrangement makes it possible to write information on both of the first and second storage layers 318, 320 (without erasing one of the storage layers as described above), without reversing the rotating direction of the memory disc 310. In this case, the effective memory capacity of the disc 310 is increased, without increasing the access time due to reversing the disc 310 upon switching from one of the two storage layers 318, 320 to the other.

Certainly, the above arrangement also permits efficient alternate writing and erasing operations on the first and second storage layers 318, 320 (in the manner as illustrated in FIG. 20), by rotating the memory disc 310 in the same direction.

Figure 24:
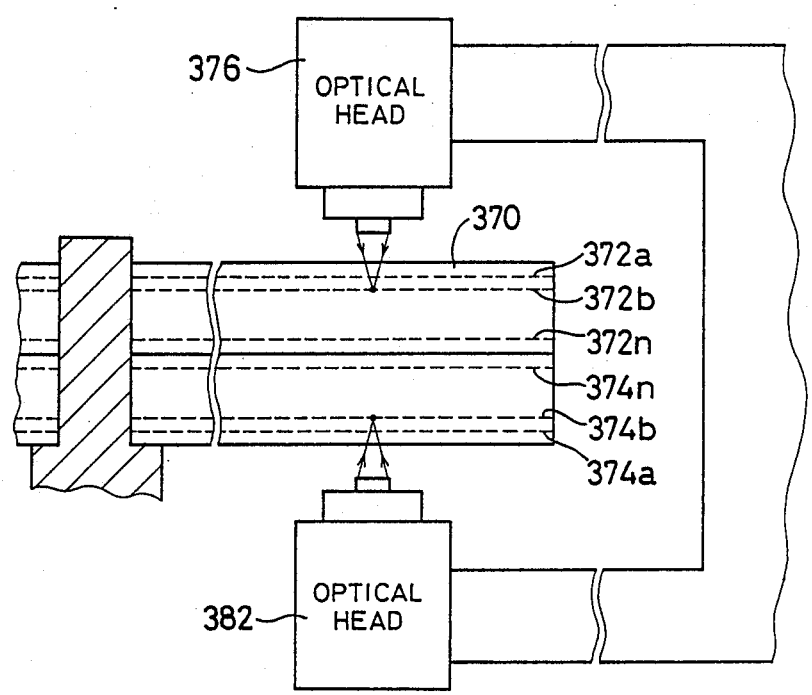
FIG. 24 is a schematic view showing still another embodiment of the invention.

Referring to FIG. 24, there is shown a magneto-optical memory disc 370 which has a plurality of first storage layers 372a through 372n on one of its opposite sides, and a plurality of second storage layers 374a through 374n on the other side. Each of the first storage layers 372a-n has a spiral track formed in one direction as viewed in a direction from a first optical head 376 toward the memory disc 370. On the other hand, each of the second storage layers 374a-n has a spiral track formed in the opposite direction as viewed in a direction from a second optical head 382 toward the memory disc 370. That is, the spiral tracks on the first storage layers 372a-n and the spiral tracks on the second storage layers 374a-n are formed in the same direction, as viewed in the same direction toward the disc 370, for example, from the first optical head 376 toward the disc 370, as in the preceding embodiment. This is true for the direction of recording of information on the first and second storage layers 372a-n and 374a-n, so that the information writing and erasing operations on the corresponding first and second storage layers may be effected by rotating the disc 370 in the same direction.

The first optical head 376 is adapted to focus a laser beam selectively on one of the first storage layers 372a-n, under the control of a writing control device (not shown), which activates a suitable device to move objective lens along its optical axis, or selects one of optical converging systems corresponding to the storage layers 372a-n. The second optical head 382 has the same construction as the first optical head 376, so that a laser beam is converged selectively on one of the second storage layers 374a-n.

In the present embodiment, too, the first and second optical heads 376, 382 may perform simultaneous writing and erasing operations, on the corresponding first and second storage layers 372a-n, 374a-n, while the memory disc 370 is rotated in the same direction. More particularly, information is written on one of the first storage layers 372a-n by the first optical head 376 while the corresponding one of the second storage layers 374a-n is cleared by the second optical head 382. Further, the recorded information may be read out from the first and second storage layers 372a-n, 374a-n, simultaneously or one after the other, by the optical heads 376, 382, or exclusive reading heads as disclosed in the laid-open publication previously identified.

Figure 25:
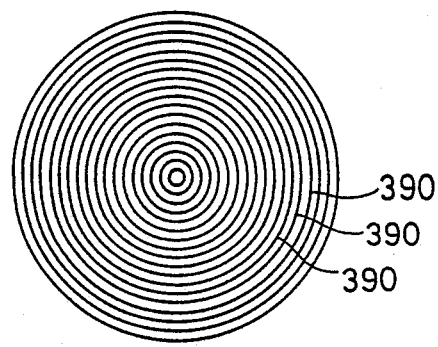
FIG. 25 is a plan view showing a memory disc which have concentric recording tracks.

While the memory discs 310, 370 used in the embodiments of FIGS. 21-23 and FIG. 24 have spiral tracks, these spiral tracks may be replaced by a multiplicity of concentric tracks 390 which have different diameters and whose centers are located at the axis of rotation of the memory disc, as shown in FIG. 25.

The memory disc 310 shown in FIG. 21 has the reflector layers 312, 313, these layers may be eliminated if the first and second storage layers 318, 320 are sufficiently thick.

While the present invention has been described in its preferred embodiments with a certain degree of particularity, it is to be understood that the present invention is by no means confined to the precise details of the illustrated embodiments, but various changes, modifications and improvements may be made in the invention, without departing from the spirit and scope of the invention defined in the following claims.

What is claimed is:

1. A magneto-optical recording apparatus for writing information on a magneto-optical recording medium, wherein the improvement comprises:
   said magneto-optical recording medium having at least one pair of magneto-optical storage layers each pair consisting of a first storage layer and a second storage layer, said first and second storage layers having at least one pair of corresponding recording segments, each of said at least one pair of mutually corresponding recording segments consisting of a first recording segment provided on said first storage layer and a second recording segment provided on said second storage layer;
   first writing/erasing means for writing and erasing information on said first storage layer;
   second writing/erasing means for writing and erasing information on said second storage layer; and
   recording control means connected to said first and second writing/erasing means, for activating one of said first and second writing/erasing means to erase previous information already recorded on corresponding one of said first and second recording segments of said each pair of corresponding recording segments, while activating the other of said first and second writing/erasing means to write first new information on the other of said first and second recording segments, upon reception of a command to write second new information, said recording control means activating said other writing/erasing means to erase said first new information recorded on said other of said first and second recording segments, while activating said one writing/erasing means to write said second new information on said one of said first and second recording segments.

2. A magneto-optical recording apparatus according to claim 1, wherein said magneto-optical recording medium comprises a magneto-optical memory disc which has said at least one pair of magneto-optical storage layers formed on one of opposite sides thereof, and said first and second writing/erasing means comprise a single common optical head or a pair of optical heads disposed opposite to said one of opposite sides of said memory disc, to expose local spots on said first and second storage layers to light beams.

3. A magneto-optical recording apparatus according to claim 1, wherein said magneto-optical recording medium comprises a magneto-optical memory disc which has said first and second storage layers on opposite sides thereof, respectively, and wherein said first and second writing/erasing means comprise a pair of optical heads which are disposed opposite to said opposite sides of said memory disc, to expose local spots on said first and second storage layers to light beams.

4. A magneto-optical recording apparatus according to claim 1, wherein each of said first and second recording segments of said first and second storage layers of said each pair of magneto-optical storage layers has a check bit, and a series of recording bits following said check bit, said check bit indicating whether information has been recorded on said recording bits, said writing control means establishing one of a writing mode and an erasure mode for each of said first and second writing/erasing means, depending upon a state of said check bit.

5. A magneto-optical recording apparatus for writing information on a magneto-optical recording medium, wherein the improvement comprises:
said magneto-optical recording medium having at least one pair of magneto-optical storage layers each pair consisting of a first storage layer formed on one of opposite sides thereof, and a second storage layer formed on the other side thereof;
a first optical head disposed opposite to said one side of said recording medium for writing information on said first storage layer, said first optical head including a first magnetizing coil and having a first focal point on said first storage layer;
a second optical head disposed opposite to said other side of said recording medium for writing information on said second storage layer, said second optical head having a second magnetizing coil and including a second focal point on said second storage layer;
first positioning means for positioning said first optical head such that said first focal point is moved along a first path parallel to said first storage layer; and
second positioning means for positioning said second optical head such that said second focal point is moved along a second path parallel to said second storage layer, said first and second paths extending so as not to intersect each other in a plane parallel to a plane of said recording medium.

6. A magneto-optical recording apparatus according to claim 5, wherein said magneto-optical recording medium comprises a magneto-optical memory disc which has said first and second storage layers on opposite sides thereof, respectively, and wherein said first and second positioning means comprises:
a common holder for supporting said first and second optical heads such that said first and second paths are alinged with a straight line passing an axis of rotation of said memory disc, and such that said first and second optical heads are located on opposite sides of said axis of rotation; and
guiding means for guiding said common holder to move said first optical head in one of radially inward and outward directions of said memory disc while moving said second optical head in the other of said radially inward and outward directions.

7. A magneto-optical recording apparatus according to claim 5, wherein said magneto-optical recording medium comprises a magneto-optical memory disc which has said first and second storage layers on opposite sides thereof, respectively, and wherein said first and second positioning means are operable to move said first and second optical heads such that said first path and said second path lie on respective first and second straight lines which intersect each other at a point adjacent to an axis of rotation of said memory disc.

8. A magneto-optical recording apparatus according to claim 7, wherein said first and second optical heads comprise a common stationary head body which emits a first light beam in a first direction parallel to said first path, and a second light beam in a second direction parallel to said second path, and further comprise a first and a second movable part which are movable along said first and second paths, respectively, said first and second movable parts receiving said first and second light beams from said stationary head body, and coverging the received first and second light beams on said first and second storage layers, respectively.

9. A magneto-optical recording apparatus for writing information on a magneto-optical recording medium, wherein the improvement comprises:
said magneto-optical recording medium having at least one pair of magneto-optical storage layers each pair consisting of a first storage layer formed on one of opposite sides thereof, and a second storage layer formed on the other side thereof, said first and second storage layers having at least one pair of mutually corresponding recording segments, each of said at least one pair of corresponding recording segments consisting of a first recording segment provided on said first storage layer and a second recording segment provided on said second storage layer;
a first optical head for exposing local spots on said first storage layer to a first light beam and thereby writing and erasing information on said first storage layer, said first optical head having a first focal point on said first storage layer;
a second optical head for exposing local spots on said second storage layer to a second light beam and thereby writing and erasing information on said second storage layer, said second optical head having a second focal point which is adjacent to said first focal point in a direction parallel to said first and second storage layers;
common magnetic-field generating means for producing magnetic fields in a predetermined direction, at the exposed local spots on said first and second storage layers; and recording control means for activating said magnetic-field generating means to produce said magnetic fields, and activating one of said first and second optical heads to erase previous information already recorded on corresponding one of said first and second recording segments of said each pair of corresponding recording segments, while activating the other of said first and second optical heads to write first new information on the other of said first and second recording segments, upon reception of a command to write second new information on said each pair of corresponding recording segments, said recording control means activating said other optical head to erase said first new information recorded on said other of said first and second recording segments, while activating said one optical head to write said second new information on said one of said first and second recording segments.

10. A magneto-optical recording apparatus for writing information on a magneto-optical memory disc, wherein the improvement comprises:

said magneto-optical memory disc having at least one pair of magneto-optical storage layers each pair consisting of a first storage layer and a second storage layer which are formed on opposite sides thereof, each of said first and second storage layers having at least one recording track which is formed in a substantially circumferential direction of said memory disc;

a first optical head disposed on one of said opposite sides of said memory disc, for writing first information on said at least one recording track on said first storage layer;

a second optical head disposed on the other side of said memory disc, for writing second information on said at least one recording track on said second storage layer;

driving means for rotating said memory disc about an axis thereof, between said first and second optical heads, during operations of said first and second optical heads; and recording control means for activating said first and second optical heads and said driving means such that said first information and said second information are written on the recording tracks on said first and second storage layers, respectively, in the same circumferential direction of said memory disc, as viewed in a direction parallel to said axis of rotation of said memory disc, from one of said first and second optical heads toward the other optical head.

11. A magneto-optical recording apparatus according to claim 10, wherein said at least one recording track of said each of the first and second storage layers consists of a multiplicity of concentric tracks which have centers at said axis of rotation of the memory disc.

12. A magneto-optical recording apparatus according to claim 10, wherein said at least one recording track of said each of the first and second storage layers consists of a single spiral track which has an inner end near said axis of rotation of the memory disc, said spiral track of said first storage layer being formed in one of clockwise and counterclockwise directions as viewed from said first optical head toward said second optical head while said spiral track of said second storage layer being formed in the other of said clockwise and counterclockwise directions as viewed from said second optical head toward said first optical head.

13. A magneto-optical recording apparatus according to claim 10, wherein said at least one pair of magneto-optical storage layers consist of a plurality of pairs of magneto-optical storage layers, each of said first and second storage layers of each of said plurality of pairs of magneto-optical storage layers consisting of a single spiral track which has an inner end near said axis of rotation of said memory disc, said spiral track of said first storage layer being formed in one of clockwise and counterclockwise directions as viewed from said first optical head toward said second optical head while said spiral track of said second storage layer being formed in the other of said clockwise and counterclockwise directions as viewed from said second optical head toward said first optical head.

* * * * *